United States Patent
Miyakoshi

(10) Patent No.: US 8,903,222 B2
(45) Date of Patent: Dec. 2, 2014

(54) IMAGE REPRODUCING APPARATUS, IMAGE REPRODUCING METHOD, IMAGE CAPTURING APPARATUS, AND CONTROL METHOD THEREFOR

(75) Inventor: Daisuke Miyakoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1088 days.

(21) Appl. No.: 12/524,133

(22) PCT Filed: Jan. 31, 2008

(86) PCT No.: PCT/JP2008/051570
§ 371 (c)(1),
(2), (4) Date: Jul. 22, 2009

(87) PCT Pub. No.: WO2008/099685
PCT Pub. Date: Aug. 21, 2008

(65) Prior Publication Data
US 2010/0092151 A1    Apr. 15, 2010

(30) Foreign Application Priority Data
Feb. 1, 2007   (JP) .................................. 2007-022676

(51) Int. Cl.
*H04N 5/92*       (2006.01)
*H04N 21/432*    (2011.01)
(Continued)

(52) U.S. Cl.
CPC ........... *H04N 5/772* (2013.01); *H04N 21/4325* (2013.01); *H04N 5/147* (2013.01); *H04N 5/144* (2013.01); *H04N 21/4334* (2013.01); *H04N 5/145* (2013.01); *H04N 5/23245* (2013.01); *H04N 21/440281* (2013.01); *H04N 21/4223* (2013.01); *H04N 9/8042* (2013.01); *H04N 5/783* (2013.01); *H04N 5/232* (2013.01)
USPC .......................................... 386/248; 386/239

(58) Field of Classification Search
None
See application file for complete search history.

(56) References Cited

U.S. PATENT DOCUMENTS 4,496,995 A  *   1/1985  Colles et al. ................... 386/233
5,274,453 A  *  12/1993  Maeda ............................ 348/584
(Continued)

FOREIGN PATENT DOCUMENTS

EP     2 079 231      7/2009
JP    2004-129217    4/2004
(Continued)

OTHER PUBLICATIONS

International Search Report dated Mar. 25, 2008.
(Continued)

*Primary Examiner* — William C Vaughn, Jr.
*Assistant Examiner* — Eileen Adams
(74) *Attorney, Agent, or Firm* — K&L Gates LLP

(57) ABSTRACT

The present invention relates to an image reproducing apparatus, an image reproducing method, an image capturing apparatus, and a control method therefor. In the present invention, in order to reproduce an image signal of a captured image that is generated by performing image capture at an image rate higher than a preset image rate, an image signal to be reproduced is supplied to a signal processing unit that converts an image signal into the preset image rate, and the image rate of this image signal to be reproduced is controlled on the basis of reproduction control information generated using a motion detection result of the captured image to reduce the reproduction speed of the captured image in accordance with an increase in motion detected. An image signal of a slow motion reproduction image is output.

12 Claims, 15 Drawing Sheets

(51) Int. Cl.
*H04N 5/14* (2006.01)
*H04N 21/433* (2011.01)
*H04N 5/77* (2006.01)
*H04N 5/232* (2006.01)
*H04N 21/4402* (2011.01)
*H04N 21/4223* (2011.01)
*H04N 9/804* (2006.01)
*H04N 5/783* (2006.01)

(56) References Cited

U.S. PATENT DOCUMENTS

| | | |
|---|---|---|
| 6,456,320 B2 * | 9/2002 | Kuwano et al. ............... 348/143 |
| 2003/0215010 A1 | 11/2003 | Kashiwa |
| 2004/0022521 A1 | 2/2004 | Kishi et al. |
| 2004/0136689 A1 | 7/2004 | Oka |
| 2006/0104609 A1 | 5/2006 | Ohmori et al. |

FOREIGN PATENT DOCUMENTS

| | | |
|---|---|---|
| JP | 2004-242267 | 8/2004 |
| JP | 2005-295423 | 10/2005 |
| JP | 2006-135808 | 5/2006 |
| JP | 2006-211191 | 8/2006 |
| WO | 2006-082787 | 8/2006 |

OTHER PUBLICATIONS

Supplementary European Search Report issued on Mar. 25, 2010 for corresponding EP 08 71 0668.
Japanese Divisional Application, filed Nov. 21, 2011 and assigned application serial No. 2011-253683, associated with Japanese Patent Application Serial No. 2008-558036, filed Jan. 31, 2008. (46 pages).
Japanese Office Action issued May 29, 2012, for corresponding Japanese Appln. No. 2008-558036.
Korean Office Action issued May 17, 2014, for corresponding Korean Appl. No. 10-2009-7016168.

* cited by examiner

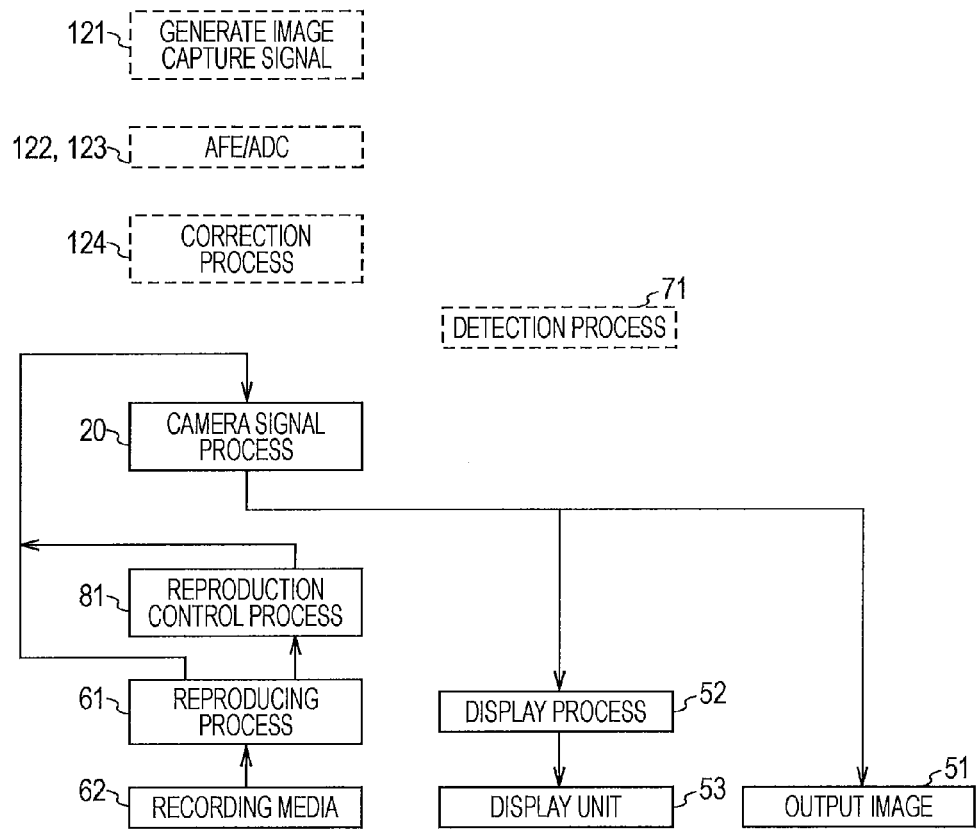
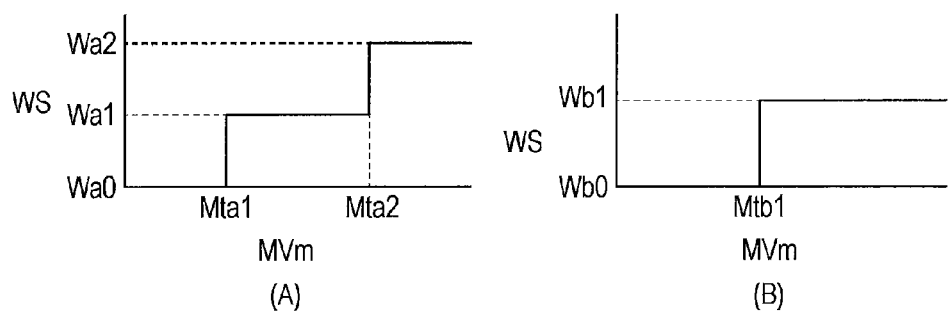

|  |  | a | b | c | d |
|---|---|---|---|---|---|
| ×1 | Wa0 | 2 | 2 | 2 | 2 |
|  | Wa1 | 1 | 1 | 3 | 3 |
|  | Wa2 | 1 | 1 | 2 | 4 |
| ×1/2 | Wb0 | 2 | 2 |  |  |
|  | Wb1 | 1 | 3 |  |  |

(C) VDr (D) DV3: 1 | 2 | 3 | 4 | 5 | 6 | 7 | 8 | 9 | 10 | 11 | 12 | 13 | 14 | 15 | 16

(E) Dfwa: 1 | 2' | 3' | 4'

(F) Dfra: 1 | 2' | 3' | 4'(1+2+3+4) | 9 | 9 | 10'(9+10) | 13 | 13 | 15 | 15

(G) Dfwb: 5 | 6' | 7' | 8' | 10' | 11 | 12' | 14 | 14

(H) Dfrb: 5 | 6' | 7' | 8'(5+6+7+8) | 11 | 12'(11+12)

(I) VDs (J) DH DVout: 4'(1+2+3+4) | 8'(5+6+7+8) | 10'(9+10) | 12'(11+12) | 13 | 14 | 15

IMAGE REPRODUCING APPARATUS, IMAGE REPRODUCING METHOD, IMAGE CAPTURING APPARATUS, AND CONTROL METHOD THEREFOR

CROSS REFERENCE TO RELATED APPLICATIONS

The present application is a national stage of International Application No. PCT/JP2008/051570 filed on Jan. 31, 2008 and claims priority to Japanese Patent Application No. 2007-022676 filed on Feb. 1, 2007, the disclosures of which are incorporated herein by reference.

BACKGROUND

The present invention relates to an image reproducing apparatus, an image reproducing method, an image capturing apparatus, and a control method therefor. More specifically, the present invention is intended to perform image capture at an image rate higher than a reference image rate, which is set in advance, so that when an image signal of a generated captured image of a captured image is reproduced at the reference image rate, the reproduction speed is controlled in accordance with motion in the captured image.

Conventionally, in Japanese Unexamined Patent Application Publication No. 2005-295423, a method in which a captured image is temporarily held in a memory and is further recorded on a recording medium so that slow motion video can be reproduced in smooth motion.

That is, in a technique disclosed in Japanese Unexamined Patent Application Publication No. 2005-295423, an image signal having a field frequency of, for example, 240 fields per second, which is higher than a normal field frequency of video signal, namely, 50 fields per second or 60 fields per second, is generated, and this image signal is sequentially stored in a memory. Further, when image capture is completed, the image signal stored in this memory is read at the normal field frequency of video signal and is recorded on a recording medium such as a hard disk device. Further, when a user instructs reproduction, the image signal recorded on this recording medium is reproduced at the normal field frequency of video signal. Therefore, a slow motion reproduction image with smooth motion can be obtained.

Incidentally, when the technique of Japanese Unexamined Patent Application Publication No. 2005-295423 is used, since an image signal of a captured image is stored in a memory at a high speed and is thereafter read from the memory and recorded on a recording medium, the time allowed for capturing an image with one-time image capture is limited by the capacity of the memory. For this reason, if the memory has a small capacity, it is difficult to hold an image signal of a captured image to be reproduced in slow motion in the memory. For example, if the timing of starting writing of an image signal in the memory is earlier than that of a captured image scene to be reproduced in slow motion, there is no space in the memory when the captured image scene to be reproduced in slow motion is written, and the image signal cannot be held. This causes a problem of missing a precious image capturing opportunity. Further, if the capacity of the memory is increased so that an image signal of a captured image to be reproduced in slow motion can be easily held in the memory, cost is increased. In addition, in a method in which an image signal of a captured image is stored in a memory and is thereafter read and recorded on a recording medium, a next scene cannot be captured before all image capture results stored in the memory have been read. For this reason, in a case where a desired scene is repeated at short intervals, some of the repeated scenes may be missed being captured.

Further, if an image signal of a high-speed captured image is recorded on a recording medium without the intervention of a memory, an image signal of a captured image to be reproduced in slow motion can be recorded on the recording medium even without controlling a recording timing of a captured image in accordance with memory capacity. However, if an image signal recorded in this manner is reproduced at a normal field frequency of video signal, all captured images recorded are reproduced in slow motion. Thus, there is a case where the waiting time for a desired slow motion image to be displayed is long.

SUMMARY

Technical Problem

In consideration of the foregoing points, a feature of the present invention is to easily obtain a slow motion image of an object in motion.

In order to solve the above problem, an image reproducing apparatus of the present invention is configured to include a signal reproducing unit that reproduces an image signal of a captured image that is generated by performing image capture at an image rate higher than a preset image rate; a reproduction control information generating unit that generates reproduction control information using a motion detection result obtained by performing motion detection using the image signal output from the signal reproducing unit; a signal processing unit that converts an image rate of the image signal output from the signal reproducing unit into the preset image rate; and a control unit that controls the image rate of the image signal output from the signal reproducing unit to the signal processing unit on the basis of the reproduction control information to reduce a reproduction speed of the captured image in accordance with an increase in motion indicated by the motion detection result.

Further, an image reproducing method of the present invention is configured to include a signal reproducing step of reproducing an image signal of a captured image that is generated by performing image capture at an image rate higher than a preset image rate; a reproduction control information generating step of generating reproduction control information using a motion detection result obtained by performing motion detection using an image signal to be reproduced in the signal reproducing step; a signal processing step of converting an image rate of an image signal to be reproduced in the signal reproducing step into the preset image rate; and a reproduction controlling step of controlling the image rate of the image signal reproduced in the signal reproducing step unit, which is used in the signal processing step, on the basis of the reproduction control information to reduce a reproduction speed of the captured image in accordance with an increase in motion detected in the motion detection.

An image capturing apparatus of the present invention is configured to include an image capturing unit that generates an image signal of a captured image that is generated by performing image capture at an image rate higher than a preset image rate; a reproduction control information generating unit that generates, using a motion detection result obtained by performing motion detection using the image signal generated by the image capturing unit, reproduction control information for reducing a reproduction speed of the captured image in accordance with an increase in motion detected in the motion detection during reproduction of the image signal; and an output unit that outputs the generated reproduction control information in correspondence with the image signal.

A control method for an image capturing apparatus of the present invention is configured to include an image capturing step of generating an image signal of a captured image that is generated by performing image capture at an image rate higher than a preset image rate; a reproduction control information generating step of generating, using a motion detection result obtained by performing motion detection using the image signal generated in the image capturing step, reproduction control information for reducing a reproduction speed of the captured image in accordance with an increase in motion detected in the motion detection during reproduction of the image signal; and an outputting step of outputting the reproduction control information in correspondence with the image signal.

According to the present invention, a slow motion image of an object in motion can be easily obtained.

Additional features and advantages of the present invention are described in, and will be apparent from, the following Detailed Description and the Figures.

BRIEF DESCRIPTION OF THE FIGURES

FIG. 12 is a diagram for explaining a process when the captured image recorded in the high-speed image capture mode is reproduced.

FIG. 13 is a diagram for explaining the relationship between a motion vector and a weighting coefficient setting signal.

FIG. 19 is a timing chart when the captured image recorded in the high-speed image capture mode is reproduced.

DETAILED DESCRIPTION

Figure 1:
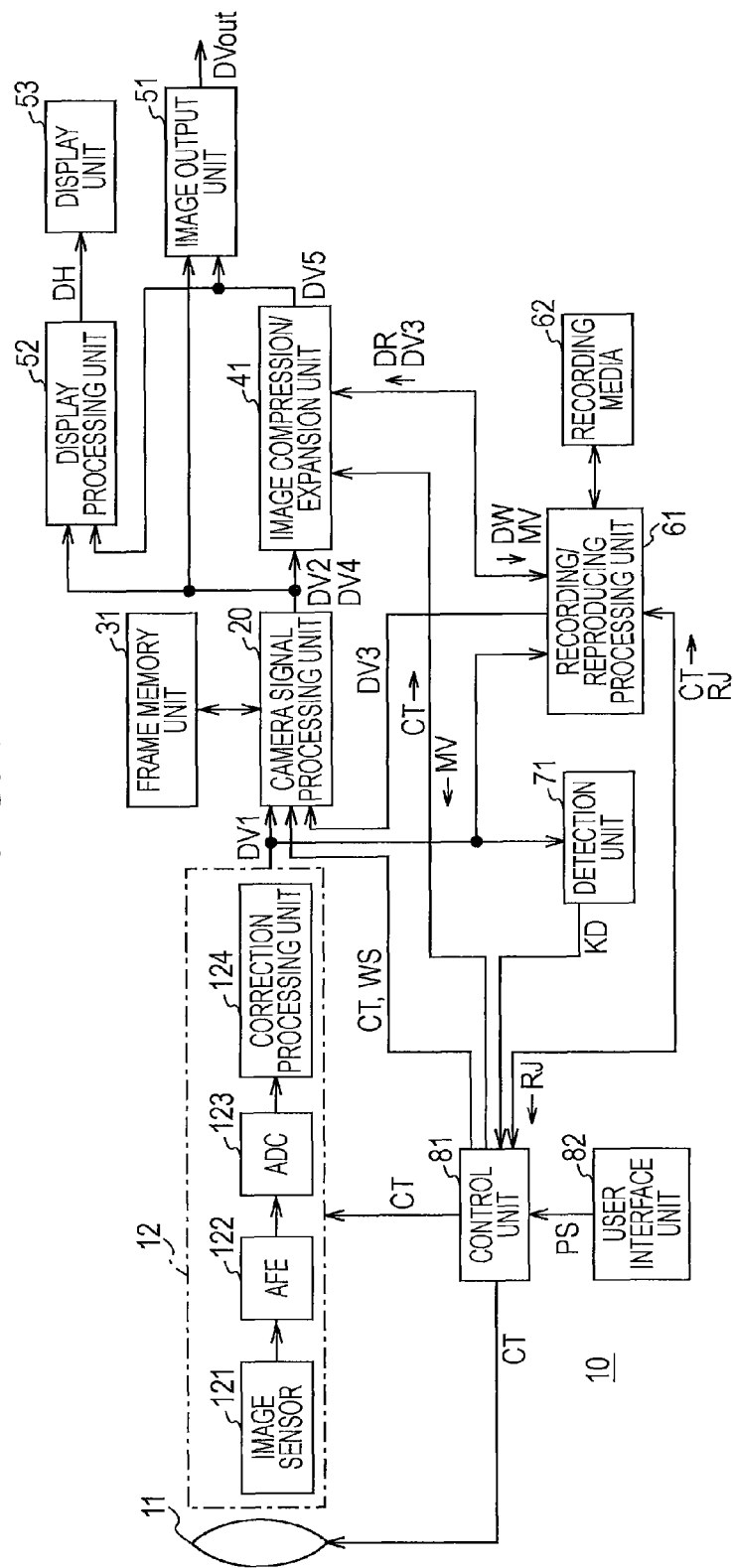
FIG. 1 is a block diagram illustrating the structure of an image capturing apparatus.

In the following, an embodiment of the present invention will be explained with reference to the drawings. FIG. 1 is a block diagram illustrating the structure of an image capturing apparatus. An image capturing apparatus 10 is configured to be capable of switching between, as operation modes, a standard image capture mode and a high-speed image capture mode. The standard image capture mode is an operation mode during normal image capture, in which an image signal of a reference image rate which is set in advance is generated. The high-speed image capture mode is an operation mode in which image capture is performed at a speed higher than that in the standard image capture mode so that a slow motion reproduction image having a high time resolution can be obtained to generate an image signal of an image rate which is higher than the reference image rate and which is an integer multiple of the reference image rate (hereinafter referred to as a "high-speed image rate"). Here, the term reference image rate refers to a field rate or frame rate used in the television system. When the image capturing apparatus 10 is in the standard image capture mode, the image capturing apparatus 10 generates an image signal of the reference image rate, for example, an image signal of the interlaced scanning type of 60 fields per second or an image signal of the non-interlaced type with 60 frames per second. Further, when the image capturing apparatus 10 is in the high-speed image capture mode, the image capturing apparatus 10 generates an image signal of a high-speed image rate, for example, an image signal of the interlaced scanning type of 240 fields per second or an image signal of the non-interlaced type of 240 frames per second. Note that in the following explanation, a case is illustrated as an example where an image signal of the non-interlaced type of 60 frames per second (60 [fps]) is generated as an image signal of the reference image rate and an image signal of the non-interlaced type of 240 frames per second (240 [fps]), which is four times the reference image rate, is generated as an image signal in the high-speed image capture mode.

Further, in the structure of the image capturing apparatus illustrated in FIG. 1, not only a case where an image signal of a captured image is generated in the standard image capture mode and the high-speed image capture mode but also a case where an image signal can be recorded onto recording media 62 or an image signal recorded on the recording media 62 can be read to display a reproduction image or output an image signal of a reproduction image is illustrated.

In the image capturing apparatus 10, a lens unit 11 is controlled by a control unit 81, which will be described below, to be capable of changing focus, aperture, and zoom to collect incident light on an image capture surface of an image sensor 121 of an image capturing unit 12.

The image capturing unit 12 of the image capturing apparatus 10 is constructed using the image sensor 121, an AFE (Analog Front End) 122, an ADC (Analog-Digital Converter) 123, and a correction processing unit 124. The operation of the image capturing unit 12 is controlled by the control unit 81 which will be described below.

The image sensor 121 is implemented by a solid-state image capturing element of the CMOS (Complementary Metal Oxide Semiconductor) type or the like. The image sensor 121 performs a photoelectric conversion process on an optical image formed on the image capture surface, and outputs an image capture signal which is an image capture result. Note that the image sensor 121 is provided with a CDS (Correlated Double Sampling) circuit, and this CDS circuit performs a correlated double sampling process on the image capture signal to reduce noise in the image capture signal.

Further, the image sensor 121 is controlled by the control unit 81 to switch the operation thereof. When the operation mode is set to the standard image capture mode, the image sensor 121 generates an image capture signal of a reference image rate (reference frame rate), for example, an image capture signal of 60 [fps]. Further, when the operation mode is set to the high-speed image capture mode, the image sensor 121 generates an image capture signal of a high-speed image rate (high-speed frame rate) which is higher than the reference frame rate and which is an integer multiple of the reference frame rate, for example, an image capture signal of 240 [fps]. Note that even in the case of outputting an image capture signal whose frame rate is 240 [fps], identically to the case of outputting an image capture signal at the reference frame rate, the image sensor 121 reads image capture results of all pixels from an effective image region on the image capture surface and outputs an image capture signal. Further, at least one of line decimation and pixel decimation may be performed to reduce the number of pixels on one screen, as compared with a case where an image capture signal is output at the reference frame rate.

The AFE (Analog Front End) 122 performs an AGC (Automatic Gain Control) process on the image capture signal output from the image sensor 121 to control the gain of the image capture signal. The ADC (Analog-Digital Converter) 123 converts the image capture signal processed by the AFE 122, which is analog, into a digital image signal, and supplies the digital image signal to the correction processing unit 124.

Figure 2:
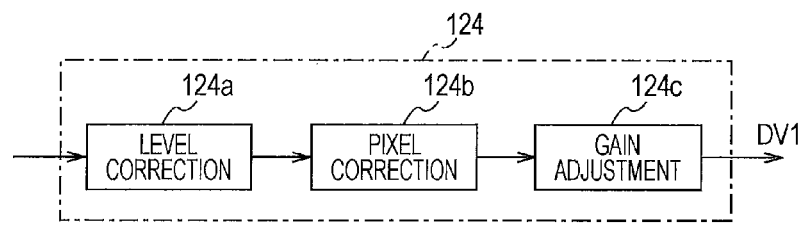
FIG. 2 is a block diagram illustrating the structure of a correction processing unit.

The correction processing unit 124 performs various correction processes on the image signal supplied from the ADC 123. FIG. 2 is a block diagram illustrating the structure of the correction processing unit 124. A level correction unit 124a of the correction processing unit 124 performs a level adjustment process on the image signal supplied from the ADC 123. A pixel correction unit 124b performs a pixel defect correction process on an image signal obtained after the level adjustment process. A white balance adjustment unit 124c executes a write balance adjustment process on an image signal obtained after the pixel defect correction process, and supplies a processed image signal DV1 to a camera signal processing unit 20, a recording/reproducing processing unit 61, and a detection unit 71 in the manner illustrated in FIG. 1.

In the standard image capture mode and the high-speed image capture mode, the camera signal processing unit 20 performs a camera signal process on the image signal DV1 supplied from the image capturing unit 12, and outputs a processed image signal DV2 to an image compression/expansion unit 41, an image output unit 51, and a display processing unit 52. Further, as described below, in a case where a captured image that is not subjected to a camera signal process is recorded on the recording media 62 in the high-speed image capture mode, during the reproduction of the recorded captured image, the camera signal processing unit 20 performs a camera signal process on an image signal DV3 supplied from the recording/reproducing processing unit 61, and outputs a processed image signal DV4 to the image output unit 51 and the display processing unit 52.

Further, the camera signal processing unit 20 is connected to a frame memory unit 31 that is constructed by, for example, an SDRAM (Synchronous Dynamic Random Access Memory) or the like. With the use of the frame memory unit 31, the camera signal processing unit 20 converts the image signal DV1 or the image signal DV3 into an image signal of the reference frame rate when the image signal DV1 or the image signal DV3 has a frame rate different from the reference frame rate. That is, the camera signal processing unit 20 outputs the image signals DV2 and DV4 of the reference frame rate regardless of the frame rate of the image signal DV1 or the image signal DV3.

Figure 3:
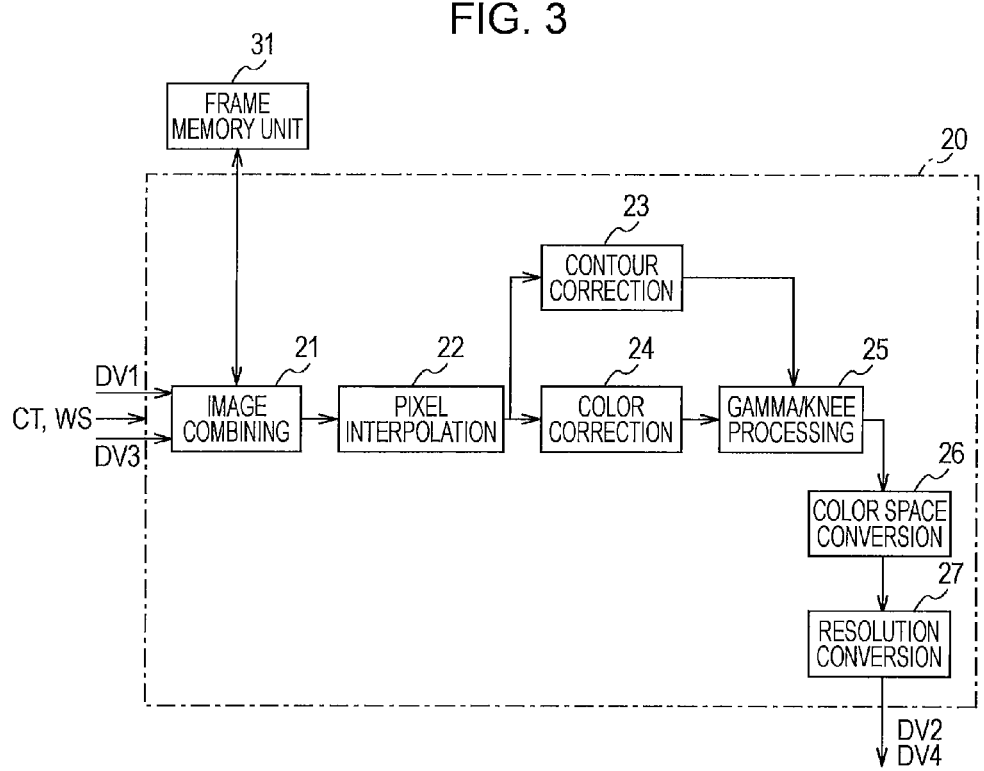
FIG. 3 is a block diagram illustrating the structure of a camera signal processing unit.

FIG. 3 is a block diagram illustrating the structure of the camera signal processing unit 20. An image combining unit 21 is designed for the purpose of performing image rate conversion so that the image signal DV1 or the image signal DV3 is converted into an image signal of the reference frame rate. When the operation mode is set to the standard image capture mode, the image signal DV1 has the reference frame rate. Thus, the image combining unit 21 supplies the image signal DV1 supplied from the correction processing unit 124 of the image capturing unit 12 to a pixel interpolation unit 22 without converting the frame rate of the image signal DV1. Further, when the operation mode is set to the high-speed image capture mode, the image combining unit 21 performs image rate conversion on the image signal DV1 supplied from the correction processing unit 124 of the image capturing unit 12 and the image signal DV3 supplied from the recording/reproducing processing unit 61 during the reproduction of the captured image recorded on the recording media 62 in the high-speed image capture mode to convert the supplied image signals into image signals of the reference frame rate, and supplies resulting image signals to the pixel interpolation unit 22. For example, the image combining unit 21 performs image combination using the frame memory unit 31 to combine frame images corresponding to a reference frame period of the image signal DV1 or DV3 to produce an image of one frame. Thus, the image signal DV1 or DV3 is converted into an image signal of the reference frame rate.

Figure 4:
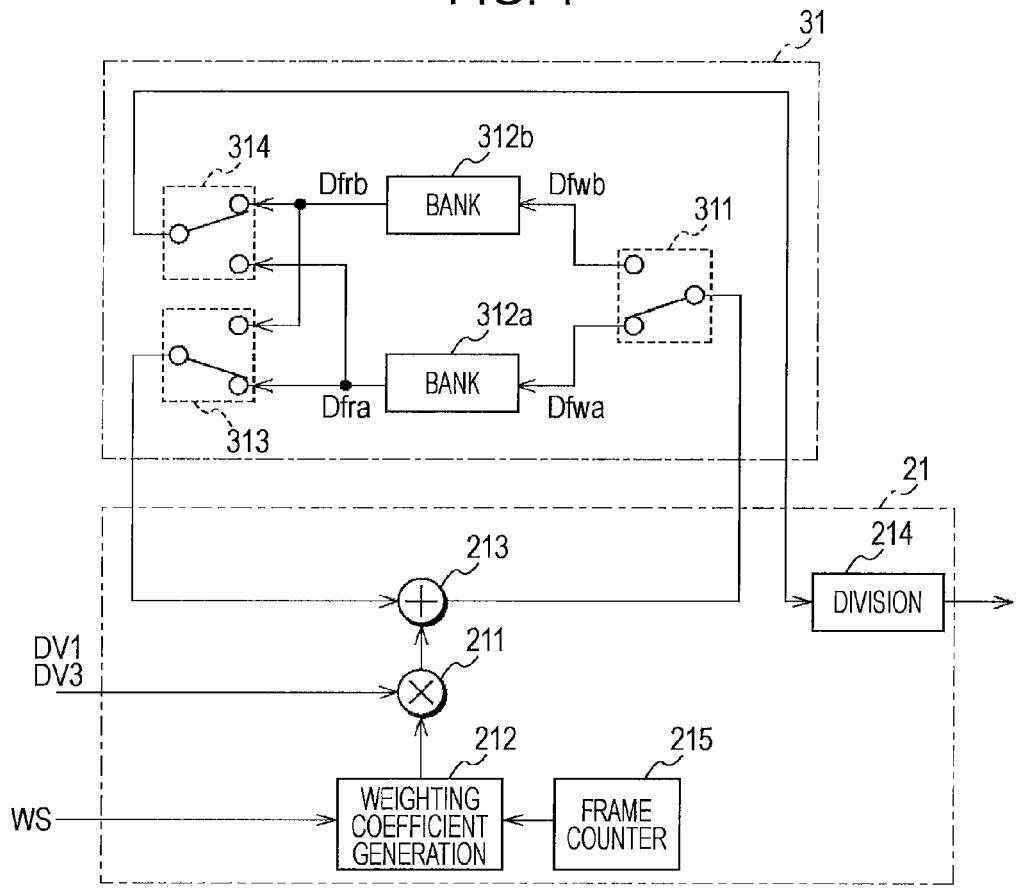
FIG. 4 is a block diagram illustrating the structure of an image combining unit and a frame memory unit.

FIG. 4 is a block diagram illustrating the detailed structure of the image combining unit 21 and the frame memory unit 31, and illustrates a case where image combination is performed using the cyclic addition of image signals with the use of the frame memory unit 31 to convert an image signal of the high-speed frame rate into an image signal of the reference frame rate.

The image combining unit 21 supplies the image signal DV1 supplied from the correction processing unit 124 or the image signal DV3 supplied from the recording/reproducing processing unit 61 to a multiplication circuit 211. The multiplication circuit 211 multiplies the image signal DV1 or the image signal DV3 by a weighting coefficient generated by a weighting coefficient generation unit 212, and supplies the image signal multiplied by the weighting coefficient to an addition circuit 213. The addition circuit 213 adds the image signal supplied from the multiplication circuit 211 to an image signal read from a bank of the frame memory unit 31, and supplies an image signal obtained after the adding process to the frame memory unit 31.

The frame memory unit 31 is constructed using a bank 312a, a bank 312b, and signal switching units 311, 313, and 314. Note that the bank 312a and the bank 312b have a memory capacity capable of storing an image signal of one frame.

The signal switching unit 311 supplies the image signal supplied from the addition circuit 213 to the bank 312a or the bank 312b. Note that an image signal to be supplied to the bank 312a is denoted by an image signal Dfwa and an image signal to be supplied to the bank 312b is denoted by an image signal Dfwb.

The signal switching unit 313 supplies an image signal Dfra read from the bank 312a or an image signal Dfrb read from the bank 312b to the addition circuit 213. The signal switching unit 314 supplies the image signal Dfra read from the bank 312a or the image signal Dfrb read from the bank 312b to a division circuit 214.

Here, in the image combining unit 21 and the frame memory unit 31, the signal switching unit 313 selects an image signal read from one bank, for example, the image signal Dfra read from the bank 312a, and the signal switching unit 311 supplies an image signal obtained as a result of addition between the selected image signal Dfra and the image signal supplied from the multiplication circuit 211 to the bank 312a as the image signal Dfwa. This would allow the bank 312a to store an image signal subjected to cyclic addition. Further, in the image combining unit 21 and the frame memory unit 31, when the cyclic addition of a predetermined number of frames is completed, cyclic addition is performed using the bank 312b, and an image signal for which the cyclic addition of the predetermined number of frames has been completed is read from the bank 312a and is supplied to the division circuit 214 through the signal switching unit 314. The cyclic addition performed in this manner would allow the image combining unit 21 and the frame memory unit 31 to, while performing cyclic addition for a reference frame period using one bank, read an image signal for which the cyclic addition of the predetermined number of frames has been completed from the other bank for the reference frame period. The read image signal can be supplied to the division circuit 214 as an image signal of the reference frame rate.

The division circuit 214 performs a division process on the image signal supplied from the signal switching unit 314 of the frame memory unit 31 in accordance with the number of frames that have been added to the weighting coefficient. Then, an image signal for which cyclic addition has been completed is supplied to the pixel interpolation unit 22 as an image signal within a predetermined signal level range. For example, when a case where the image signal DV1 has a constant signal level is considered, it is assumed that cyclic addition is performed for four frames, each frame having a weighting coefficient of "2". Then, the signal level of an image signal for which cyclic addition has been completed is eight times the signal level of the image signal DV1. For this reason, the division circuit 214 performs a division process according to the number of frames that have been added to the weighting coefficient, and multiplies the image signal for which cyclic addition has been completed by (⅛) to obtain an image signal within the predetermined signal level range.

The weighting coefficient generation unit 212 is connected to a frame counter 215. The frame counter 215 generates a count value indicating which frame among the frames to be subjected to cyclic addition the image signal to be supplied to the multiplication circuit 211 corresponds to, and supplies the count value to the weighting coefficient generation unit 212. In the case of performing cyclic addition on the image signal DV1 supplied from the correction processing unit 124, the weighting coefficient generation unit 212 generates weighting coefficients, which are equal for the individual frames to be subjected to cyclic addition, on the basis of a weighting coefficient selection value WS supplied from the control unit 81, and supplies the weighting coefficients to the multiplication circuit 211. Further, in the case of performing cyclic addition on the image signal DV3 supplied from the recording/reproducing processing unit 61, the weighting coefficient generation unit 212 generates weighting coefficients, which are equal for the individual frames to be subjected to cyclic addition, or weighting coefficients, which are different between frames, on the basis of a weighting coefficient selection value WS supplied from the control unit 81, and supplies the weighting coefficients to the multiplication circuit 211.

Figure 5:
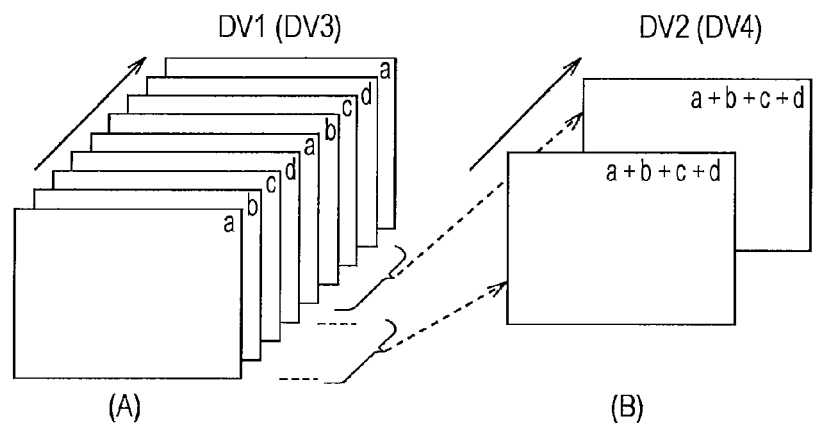
FIG. 5 is a diagram for use in the explanation of image combination.

FIG. 5 is a diagram for explaining image combination in a case where the frame rate of the image signal DV1 or DV3 is four times the reference frame rate. When image combination is performed using the image combining unit 21 and the frame memory unit 31 in the manner described above, as illustrated in part (A) of FIG. 5, images based on the image signal DV1 supplied from the correction processing unit 124 and the image signal DV3 supplied from the recording/reproducing processing unit 61 are such that, for example, four frames, namely, frames a to frame d, are combined. As illustrated in part (B) of FIG. 5, one frame (a+b+c+d) of an image of the reference frame rate is produced. Thus, the image signal DV1 or DV3 can be converted into an image signal of the reference frame rate.

The pixel interpolation unit 22 in FIG. 3 converts the image signal output from the image combining unit 21 into image signals of three planes composed of R, G, and B using a demosaic process, and outputs the image signals. A contour correction unit 23 separates high-frequency components from the supplied image signals, and generates contour correction data from the high-frequency components. A color correction unit 24 separates low-frequency components from the supplied image signals, and performs a linear matrix process or the like on the low-frequency components to perform color correction.

A gamma/knee processing unit 25 combines the contour correction signal generated by the contour correction unit 23 with the image signal processed by the color correction unit 24, and executes gamma correction, knee processing, or the like on the combined image signal. A color space conversion unit 26 converts the image signal processed by the gamma/knee processing unit 25 into image signals of a luminance signal and a color-difference signal. A resolution conversion unit 27 converts the supplied image signals into an image signal having a preset display resolution, and outputs the resulting image signal as the image signal DV2 or the image signal DV4.

The image compression/expansion unit 41 in FIG. 1 is configured to perform a process of performing motion detection using the supplied image signal, a process of compressing an image signal on the basis of a motion detection result to generate an encoded signal, and a process of expanding an encoded signal to generate an image signal.

In the standard image capture mode, upon receiving an instruction from the control unit 81 to record a captured image, the image compression/expansion unit 41 performs a compression process on the image signal DV2 output from the camera signal processing unit 20 using a moving image encoding scheme such as MPEG (Moving Picture Experts Group), and outputs an encoded signal DW to the recording/reproducing processing unit 61. In the high-speed image capture mode, upon receiving an instruction from the control unit 81 to record a captured image, the image compression/expansion unit 41 detects a motion vector MV from the image signal DV2 on a macroblock-by-macroblock basis, and outputs this motion detection result, namely, the motion vector MV, to the recording/reproducing processing unit 61 or the control unit 81.

Further, during the reproduction of a captured image recorded on the recording media 62 in the standard image capture mode, the image compression/expansion unit 41 performs an expansion process on an encoded signal DR supplied from the recording/reproducing processing unit 61, and supplies an obtained image signal DV5 to the image output unit 51 or the display processing unit 52.

In addition, when the image signal DV3 is supplied from the recording/reproducing processing unit 61, the image compression/expansion unit 41 performs motion detection using the image signal DV3 to detect a motion vector MV from the image signal DV3 on a macroblock-by-macroblock basis, and outputs this motion detection result, namely, the motion vector MV, to the control unit 81.

Figure 6:
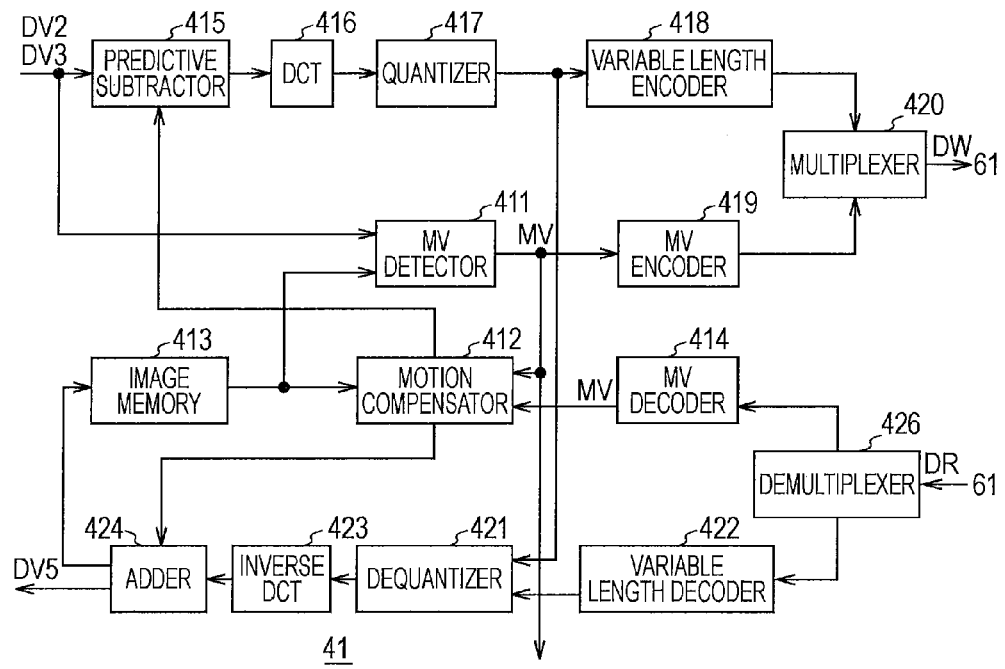
FIG. 6 is a block diagram illustrating the structure of a compression/expansion unit.

FIG. 6 is a block diagram illustrating the structure of the image compression/expansion unit 41. In the image compression/expansion unit 41, an MV detector 411 sequentially detects a motion vector MV for each macroblock from the image signal DV2. During recording in the standard image capture mode, the MV detector 411 outputs this motion vector MV to a motion compensator 412. Further, during recording in the high-speed image capture mode, the MV detector 411 outputs this motion vector MV to the recording/reproducing processing unit 61 or the control unit 81.

During the encoding of a moving image, the motion compensator 412 performs motion compensation on an image signal stored in an image memory 413 using the motion vector MV detected by the MV detector 411, and generates and outputs a predicted value for encoding. Further, during the decoding of a moving image, similarly, the motion compensator 412 generates a predicted value for decoding using a motion vector MV decoded by an MV decoder 414.

During the encoding of a moving image, a predictive subtractor 415 subtracts the predicted value for encoding, which is generated by the motion compensator 412, from the image signal DV2 input from the camera signal processing unit 20, and outputs a prediction error value.

A DCT 416 performs a two-dimensional discrete cosine transform on the output signal of the predictive subtractor 415, and outputs coefficient data obtained as a result of this process. A quantizer 417 performs a quantization process on the coefficient data generated by the DCT 416, and a variable length encoder 418 performs a variable length encoding process on output data of the quantizer 417. An MV encoder 419 performs an encoding process on the motion vector MV for encoding, which is detected by the MV detector 411. A multiplexer 420 performs a multiplexing process on output data of the variable length encoder 418 and output data of the MV encoder 419, and outputs a result as an encoded signal DW.

During encoding, a dequantizer 421 performs a dequantization process on output data of the quantizer 417 and outputs resulting data. Further, during decoding, the dequantizer 421 performs a dequantization process on output data of a variable length decoder 422, and outputs resulting data.

An inverse DCT 423 processes the output data of the dequantizer 421 in a manner opposite to that of the DCT 416, and outputs resulting data. An adder 424 adds the predicted value for encoding or decoding to an output signal of the inverse DCT 423 to generate an image signal DV5. The image memory 413 stores and holds this decoded image signal DV5 for motion compensation.

During decoding, a demultiplexer 426 separates the encoded signal DR output from the recording/reproducing processing unit 61 into a portion corresponding to the coefficient data and a portion corresponding to the motion vector MV, and outputs the portions. The MV decoder 414 decodes the motion vector MV from this output data of the demultiplexer 426, and outputs the motion vector MV to the motion compensator 412. The variable length decoder 422 decodes the coefficient data from this output data of the demultiplexer 426, and outputs the coefficient data to the dequantizer 421.

The image output unit 51 in FIG. 1 is an interface to which an external device is connected. In the standard image capture mode and the high-speed image capture mode, the image output unit 51 outputs the image signal DV2 supplied from the camera signal processing unit 20 to the external device as an output image signal DVout. Note that the external device is, for example, a monitor device or the like. Further, during the reproduction of a captured image recorded on the recording media 62 in the standard image capture mode, the image output unit 51 outputs the image signal DV5 supplied from the image compression/expansion unit 41 to the external device as an output image signal DVout. In addition, during the reproduction of a captured image recorded on the recording media 62 in the high-speed image capture mode, the image output unit 51 outputs the image signal DV4 output from the camera signal processing unit 20 to the external device as an output image signal DVout.

The display processing unit 52 is connected to a display unit 53 which is constructed by, for example, an LCD (Liquid Crystal Display). In the standard image capture mode and the high-speed image capture mode, the display processing unit 52 converts the image signal DV2 output from the camera signal processing unit 20 into a display image signal DH according to the display resolution of the display unit 53, and drives the display unit 53 using this display image signal DH so that a captured image is displayed on the display unit 53. Further, during the reproduction of a captured image recorded on the recording media 62 in the standard image capture mode, the display processing unit 52 converts the image signal DV5 output from the image compression/expansion unit 41 into a display image signal DH according to the display resolution of the display unit 53, and drives the display unit 53 using this display image signal DH so that a reproduction image is displayed on the display unit 53. In addition, during the reproduction of a captured image recorded on the recording media 62 in the high-speed image capture mode, the display processing unit 52 converts the image signal DV4 output from the camera signal processing unit 20 into a display image signal DH according to the display resolution of the display unit 53, and drives the display unit 53 using this display image signal DH so that a reproduction image or a slow motion reproduction image is displayed on the display unit 53.

The recording/reproducing processing unit 61 is controlled by the control unit 81 to perform writing or reading of a captured image to or from the recording media 62. The recording media 62 are various recording media which are randomly accessible or various recording media which are difficult to randomly access, such as a magnetic tape. Further, recording media which are randomly accessible are, for example, a hard disk device, a semiconductor memory such as a flash memory, an optical disk such as a DVD (Digital Versatile Disk), and the like.

In the standard image capture mode, the recording/reproducing processing unit 61 records the encoded signal DW output from the image compression/expansion unit 41 onto the recording media 62. Further, in the high-speed image capture mode, the recording/reproducing processing unit 61 records the image signal DV1 output from the image capturing unit 12 onto the recording media 62. At this time, the recording/reproducing processing unit 61 obtains, as reproduction control information RJ, the motion vector MV notified from the image compression/expansion unit 41, or obtains reproduction control information RJ generated by the control unit 81. The recording/reproducing processing unit 61 records this reproduction control information RJ in association with the image signal DV1. The reproduction control information RJ is information for performing reproduction control for reducing the reproduction speed of a captured image in accordance with an increase in motion of an object in a captured image or performing reproduction control for mitigating motion blur in a reproduction image.

During the reproduction of a captured image recorded in the standard image capture mode, the recording/reproducing processing unit 61 supplies the encoded signal DR read from the recording media 62 to the image compression/expansion unit 41. Further, during the reproduction of a captured image recoded in the high-speed image capture mode, the recording/reproducing processing unit 61 reads an image signal and reproduction control information RJ corresponding to the image signal from the recording media 62, and outputs the image signal DV3 and the reproduction control information RJ to the camera signal processing unit 20 and the control unit 81, respectively.

In addition, in a case where the reproduction control information RJ cannot be read during the reproduction of the captured image recorded in the high-speed image capture mode, the recording/reproducing processing unit 61 supplies the image signal DV3 to the camera signal processing unit 20 and the image compression/expansion unit 41.

A detection unit 71 detects, for a frame period, information KD necessary for aperture adjustment, focus adjustment, and white balance adjustment from the image signal DV1 output from the image capturing unit 12, and notifies the control unit 81. Note that the necessary information is, for example, an accumulative added value of pixel values in a specific region, a peak value, or the like.

The control unit 81 is connected to a user interface unit 82. The user interface unit 82 generates an operation signal PS according to a user operation, and supplies the operation signal PS to the control unit 81.

The control unit 81 is a microcontroller constructed by, for example, a CPU (Central Processing Unit), a ROM (Read Only Memory), a RAM (Random Access Memory), and the like. The control unit 81 executes a program recorded on the ROM or the like to generate a control signal CT so that the operation of the image capturing apparatus 10 can become an operation according to a user operation based on the operation signal PS, and supplies the control signal CT to the individual portions to control the operation of the individual portions. Note that in this embodiment, the program is provided by installing it in the image capturing apparatus 10 beforehand; however, instead of being installed beforehand, the program may be provided by recording it on a recording medium such as an optical disk, a magnetic disk, or a memory card, or may be provided by downloading it via a network such as the Internet.

When the operation mode is set to the standard image capture mode, the control unit 81 performs control so as to generate an image signal DV1 of the reference frame rate and display the captured image at the reference frame rate. When the operation mode is set to the high-speed image capture mode, the control unit 81 performs control so as to generate an image signal DV1 of the high-speed frame rate, perform conversion of the image rate, and display the captured image at the reference frame rate.

Further, in a case where it is determined that a recording start operation has been performed when the operation mode is the standard image capture mode, the control unit 81 further performs control to perform a compression process on an image signal of the reference frame rate that has been subjected to a camera signal process and record a resulting image signal onto the recording media 62. In a case where it is determined that a recording start operation has been performed when the operation mode is the high-speed image capture mode, the control unit 81 further performs control to generate reproduction control information RJ for performing reproduction control for reducing the reproduction speed of the captured image in accordance with an increase in motion of an object or reproduction control for mitigating motion blur in a reproduction image, and record the reproduction control information RJ in correspondence with the image signal DV1 onto the recording media 62. Note that in a case where it is determined that a recording termination operation has been performed during a recording operation, the control unit 81 performs control to stop recording onto the recording media 62.

In a case where it is determined that the operation of reproducing a captured image recorded on the recording media 62 in the standard image capture mode has been performed, the control unit 81 performs control to read a desired encoded signal from the recording media 62, perform a decoding process, and display a reproduction image at the reference frame rate, or performs control to output a reproduction image signal of the reference frame rate.

In a case where it is determined that the operation of reproducing a captured image recorded on the recording media 62 in the high-speed image capture mode has been performed, the control unit 81 performs control to read a desired image signal and reproduction control information RJ, which is in association with the image signal, from the recording media 62 and display a reproduction image at the reference frame rate, or performs control to output an image signal of the reproduction image at the reference frame rate. Further, the control unit 81 performs, on the basis of the reproduction control information RJ, reproduction control for reducing the reproduction speed of the captured image in accordance with an increase in motion of an object or reproduction control for mitigating motion blur in the reproduction image.

Further, in a case where the reproduction control information RJ cannot be obtained during the reproduction of the captured image recorded on the recording media 62 in the high-speed image capture mode, the control unit 81 generates reproduction control information RJ from an image signal read from the recording media 62, and performs, on the basis of this reproduction control information RJ, reproduction control for reducing the reproduction speed of the captured image in accordance with an increase in motion of an object or reproduction control for mitigating motion blur in a reproduction image.

Note that the control unit 81 also performs, in accordance with the information KD from the detection unit 71, control for performing aperture adjustment and focus adjustment of the lens unit 11 for a frame period and causing the correction processing unit 124 to perform white balance adjustment for a frame period.

Incidentally, in the embodiment described above, an image capturing apparatus in which the lens unit 11, the image capturing unit 12, the camera signal processing unit 20, the image compression/expansion unit 41, the recording/reproducing processing unit 61, and the like are provided as an integrated unit has been explained. However, the lens unit 11, the image capturing unit 12, the display processing unit 52, the display unit 53, and the detection unit 71 may be provided as separate units to construct an image reproducing apparatus or an image recording apparatus.

Figure 7:
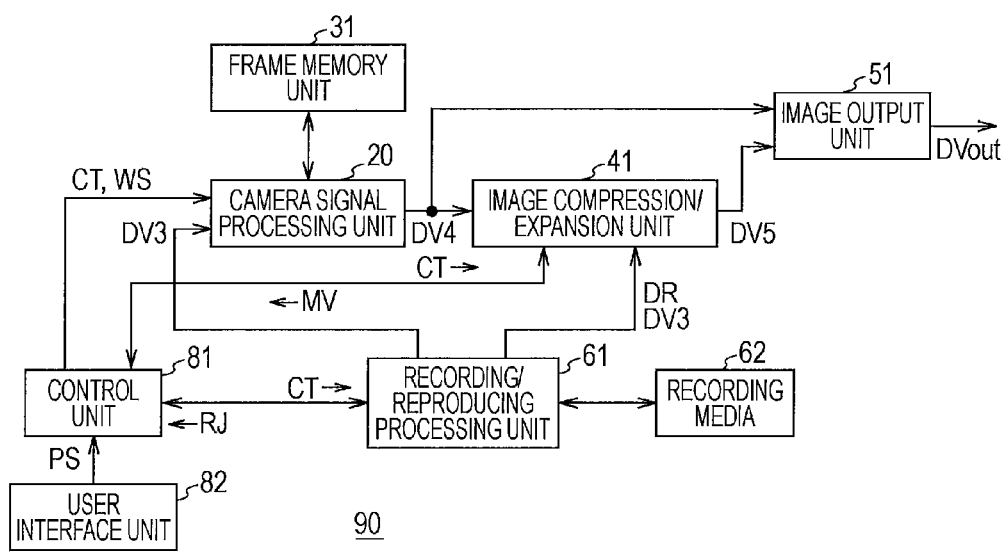
FIG. 7 is a block diagram illustrating the structure of an image reproducing apparatus.

FIG. 7 is a block diagram illustrating the structure of an image reproducing apparatus 90. Note that in FIG. 7, portions corresponding to those of FIG. 1 are assigned the same numerals.

The image reproducing apparatus 90 includes a recording/reproducing processing unit 61 for reading an encoded signal, an image signal, or the like from recording media 62, an image compression/expansion unit 41 for performing an expansion process on a read encoded signal DR, a camera signal processing unit 20 that performs a signal process using an image signal DV3 read from the recording media 62, a frame memory unit 31, an image output unit 51 for outputting an image signal DV4 output from the camera signal processing unit 20 or an image signal DV5 output from the image compression/expansion unit 41 to an external device, a control unit 81 that controls the operation of the individual portions, and a user interface unit 82.

In the image reproducing apparatus 90, when the reading of an encoded signal recorded on the recording media 62 is performed, the recording/reproducing processing unit 61 supplies a read encoded signal DR to the image compression/expansion unit 41. Note that the encoded signal is a signal obtained by performing a compression process on an image signal of the reference frame rate. The image compression/expansion unit 41 performs an expansion process on the encoded signal DR supplied from the recording/reproducing processing unit 61, and supplies an obtained image signal DV5 to the image output unit 51.

Further, in the image reproducing apparatus 90, when the reading of an image signal of the high-speed frame rate which is recorded on the recording media 62 is performed, the recording/reproducing processing unit 61 reads an image signal and reproduction control information RJ corresponding to the image signal. The camera signal processing unit 20 performs a process of converting the image signal DV3 supplied from the recording/reproducing processing unit 61 into an image signal of the reference frame rate or a camera signal process. The image output unit 51 outputs the image signal DV4 of the reference frame rate as an output image signal DVout. Further, in the image reproducing apparatus 90, in a case where control of the reproduction speed or control for mitigating motion blur is performed on the basis of the reproduction control information RJ, the control unit 81 controls the operation of the camera signal processing unit 20 or the recording/reproducing processing unit 61 on the basis of the reproduction control information RJ, and controls the frame rate of the image signal DV3 to be supplied to the camera signal processing unit 20 or a weighting coefficient used in the image combining unit 21 of the camera signal processing unit 20.

Further, in the image reproducing apparatus 90, in a case where the reproduction control information RJ cannot be obtained when the reading of an image signal of the high-speed frame rate which is recorded on the recording media 62 is performed, the recording/reproducing processing unit 61 supplies a read image signal DV3 to the camera signal processing unit 20. The camera signal processing unit 20 performs a process of converting the image signal DV3 supplied from the recording/reproducing processing unit 61 into an image signal of the reference frame rate or a camera signal process. The image output unit 51 outputs the image signal DV4 of the reference frame rate as an output image signal DVout. Further, in the image reproducing apparatus 90, in a case where reproduction control for reducing the reproduction speed of a captured image in accordance with an increase in motion of an object or reproduction control for mitigating motion blur in a reproduction image is performed, the recording/reproducing processing unit 61 supplies the read image signal DV3 to the image compression/expansion unit 41. The image compression/expansion unit 41 performs motion detection using the image signal DV3, and supplies an obtained motion vector MV to the control unit 81. The control unit 81 controls the operation of the recording/reproducing processing unit 61 on the basis of the motion vector MV so that the frame rate of the image signal DV3 to be supplied to the camera signal processing unit 20 can be changed, thus reducing the reproduction speed of a captured image in accordance with an increase in motion of an object. Further, the control unit 81 controls a weighting coefficient used in the image combining unit 21 of the camera signal processing unit 20 on the basis of the motion vector MV to mitigate motion blur in a reproduction image.

Figure 8:
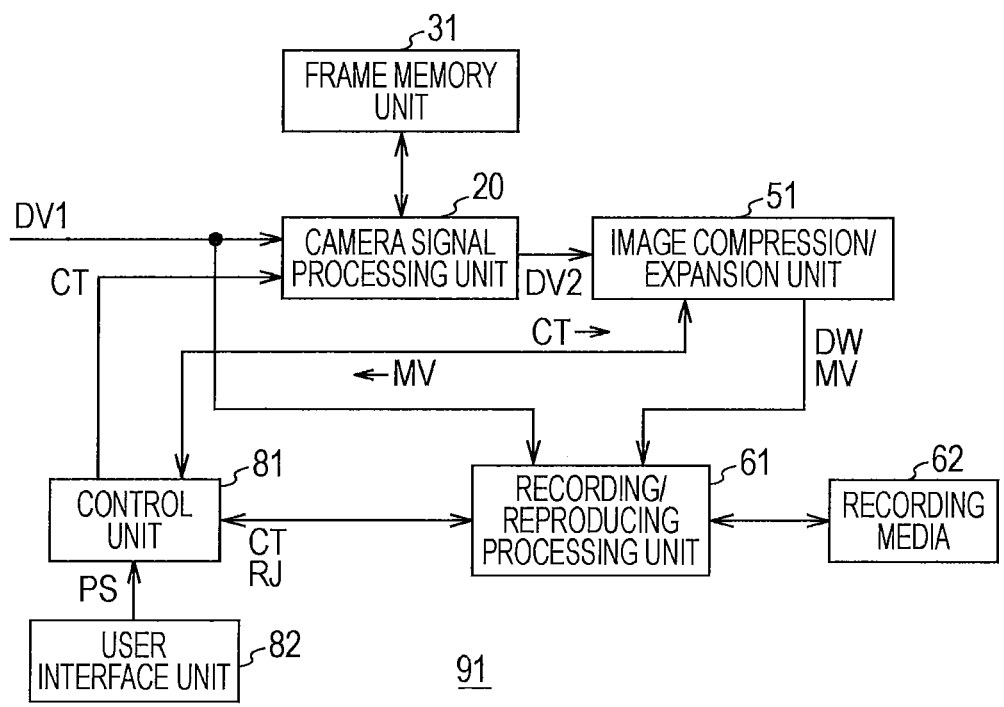
FIG. 8 is a block diagram illustrating the structure of an image recording apparatus.

FIG. 8 is a block diagram illustrating the structure of an image recording apparatus 91. Note that in FIG. 8, portions corresponding to those of FIG. 1 are assigned the same numerals.

The image recording apparatus 91 includes a camera signal processing unit 20 that performs various camera signal processes on an image signal, a frame memory unit 31, an image compression/expansion unit 41 that performs a compression process on an image signal to generate an encoded signal, a recording/reproducing processing unit 61 for writing an encoded signal DW into the recording media 62, a control unit 81 that controls the operation of the individual portions, and a user interface unit 82.

In the image recording apparatus 91, when an image signal DV1 of the reference frame rate is recorded, the image compression/expansion unit 41 performs a compression process on an image signal DV2 of the reference frame rate, which has been subjected to a camera signal process using the camera signal processing unit 20, to generate an encoded signal DW. The recording/reproducing processing unit 61 performs a process of writing the encoded signal DW generated by the image compression/expansion unit 41 into the recording media 62.

Further, when an image signal DV1 of the high-speed frame rate is recorded, the camera signal processing unit 20 performs not only a camera signal process but also image combination using the frame memory unit 31, and converts the image signal DV1 of the high-speed frame rate into an image signal of the reference frame rate. The image compression/expansion unit 41 generates a motion vector MV using the image signal DV2 of the reference frame rate which is output from the camera signal processing unit 20. The recording/reproducing processing unit 61 obtains, as reproduction control information RJ, the motion vector MV generated by the image compression/expansion unit 41, or obtains reproduction control information RJ generated by the control unit 81 on the basis of the motion vector MV. Then, the recording/reproducing processing unit 61 performs a process of writing this reproduction control information RJ into the recording media 62 in association with the image signal DV1 of the high-speed frame rate.

Figure 9:
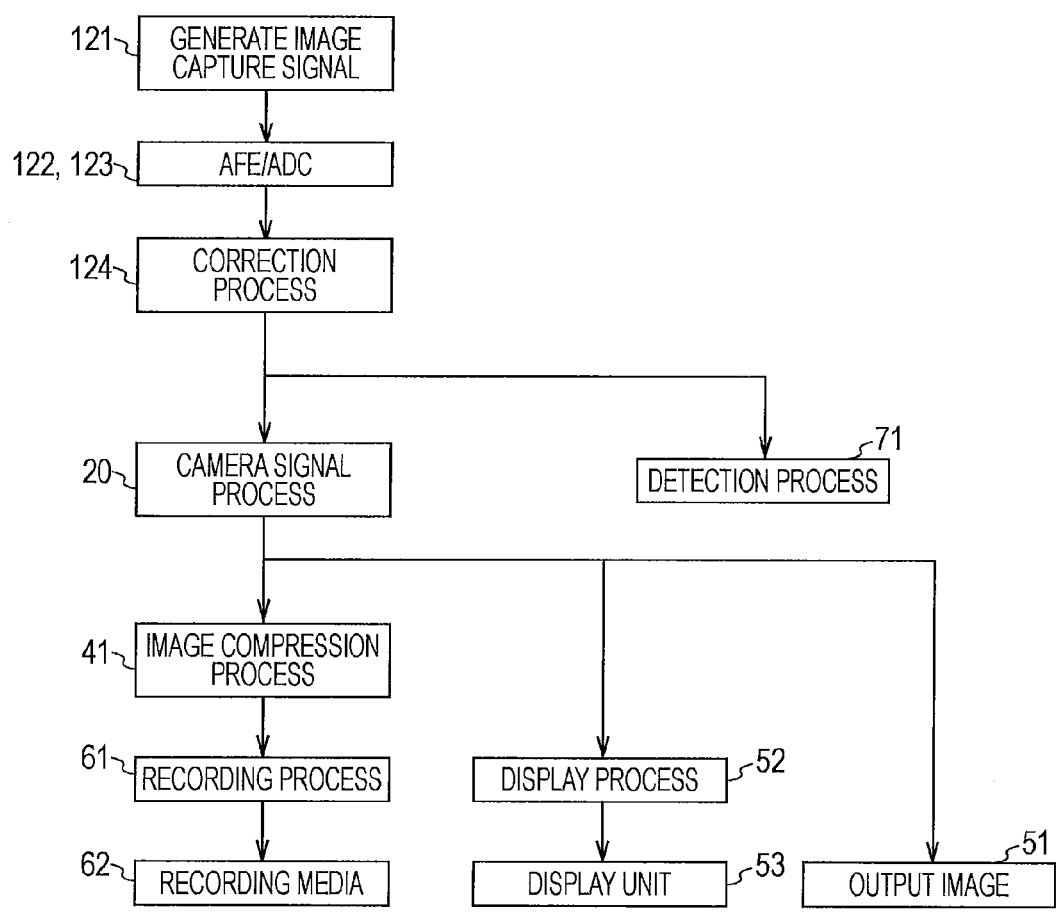
FIG. 9 is a diagram for explaining a process when a captured image is recorded in a standard image capture mode.

Next, an image capturing operation, an operation of recording a captured image, and an operation of reproducing a recorded captured image will be explained. FIG. 9 illustrates a process when the operation mode is set to the standard image capture mode. Note that in FIG. 9 and FIGS. 10 to 12, which will be described below, in order to clarify which block in FIGS. 1 and 7 each process corresponds to, the processes are assigned the numerals of corresponding blocks.

An image capturing apparatus performs the generation of an image capture signal to generate an image capture signal of a reference frame rate which is, for example, 60 [fps]. The image capturing apparatus performs AFE/ADC processes to adjust the signal level of the image capture signal and thereafter convert the image capture signal into a digital signal. The image capturing apparatus performs a correction process to generate an image signal DV1 that has been subjected to signal level or white balance adjustment and pixel defect correction. The image capturing apparatus performs a camera signal process to generate an image signal DV2 that has been subjected to contour correction, color correction, gamma correction, knee correction, and the like. Further, the image capturing apparatus performs a display process to convert the image signal DV2 into a display image signal DH having a display resolution corresponding to that of the display unit 53. Note that the image capturing apparatus performs a detection process to detect information necessary for aperture adjustment, focus adjustment, and white balance adjustment.

The image capturing apparatus performs the above processes to display a captured image on a screen of the display unit 53. Therefore, a user can check what object has been captured by viewing the image displayed on the screen of the display unit 53. Further, if the image capturing apparatus outputs an output image signal DVout, the captured image can be displayed using an external device.

Next, when a captured image is recorded, the image capturing apparatus (image recording apparatus) performs an image compression process to generate an encoded signal DW. In addition, the image capturing apparatus (image recording apparatus) performs a recording process of recording the encoded signal DW onto the recording media 62. That is, an image signal DV1 captured at the reference frame rate is encoded and recorded on the recording media 62.

Figure 10:
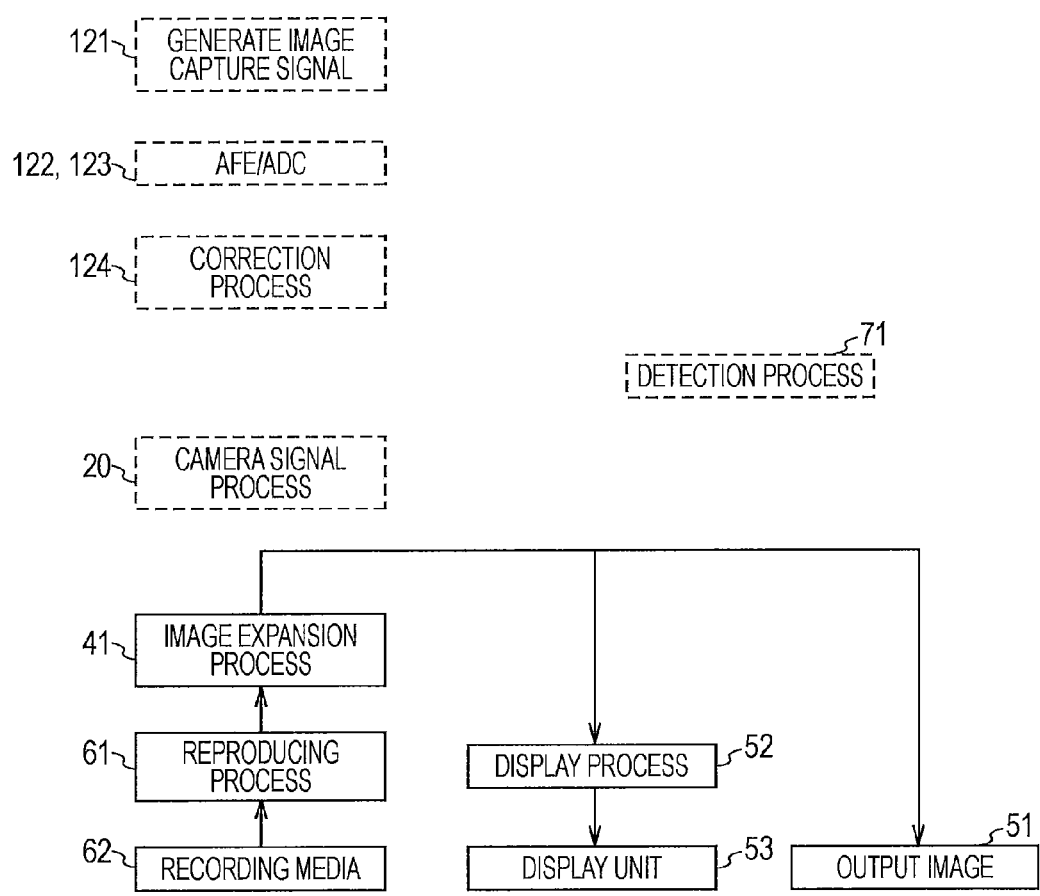
FIG. 10 is a diagram for explaining a process when the captured image recorded in the standard image capture mode is reproduced.

FIG. 10 illustrates a process when an image recorded on the recording media 62 by performing the process illustrated in FIG. 9 is reproduced. The image capturing apparatus (image reproducing apparatus) performs a reproduction process to read a desired encoded signal from the recording media 62. The image capturing apparatus (image reproducing apparatus) performs an image expansion process to generate an image signal DV5 from the encoded signal. In addition, the image capturing apparatus performs a display process to convert the image signal DV5 into a display image signal DH having a display resolution corresponding to that of the display unit 53. The image capturing apparatus performs (image reproducing apparatus) the above processes to display a reproduction image on the screen of the display unit 53. Further, if the image capturing apparatus (image reproducing apparatus) outputs an output image signal DVout, the reproduction image can be displayed using an external device.

Figure 11:
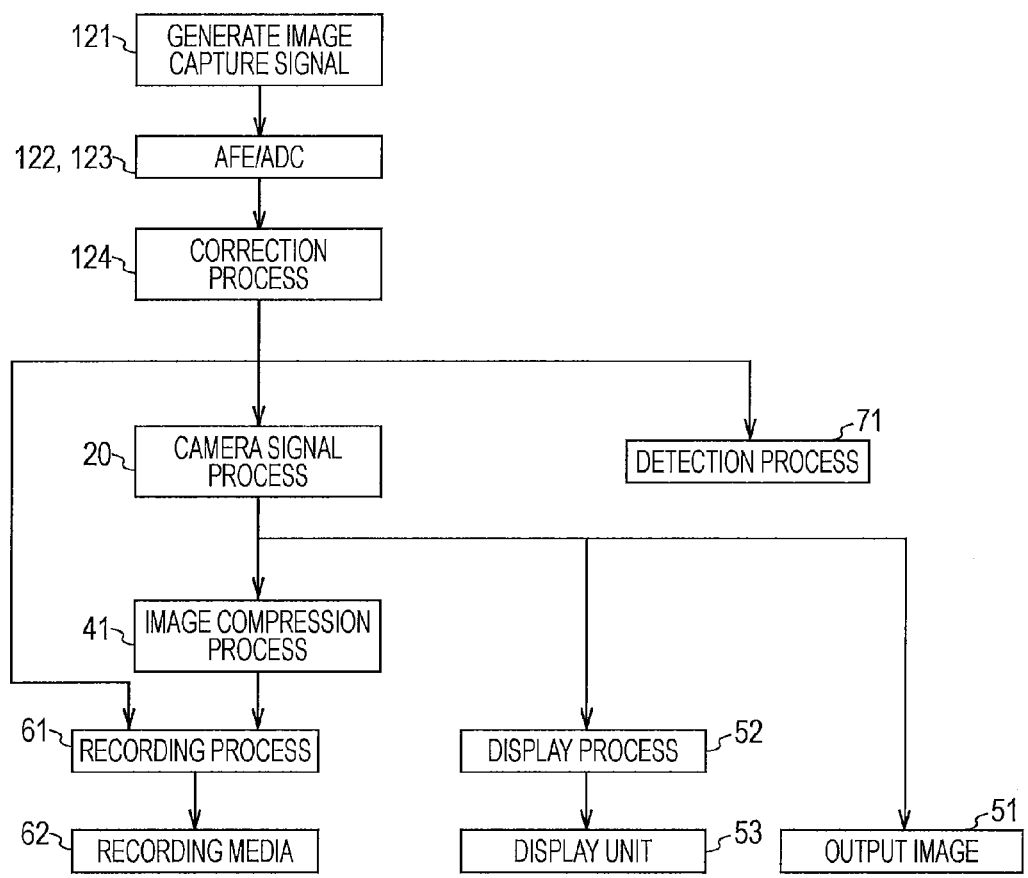
FIG. 11 is a diagram for explaining a process when a captured image is recoded in a high-speed image capture mode.

FIG. 11 illustrates a process when the operation mode is set to the high-speed image capture mode.

The image capturing apparatus performs the generation of an image capture signal to generate an image capture signal of a high-speed frame rate which is, for example, 240 [fps]. The image capturing apparatus performs AFE/ADC processes to adjust the signal level of the image capture signal and thereafter convert the image capture signal into a digital signal. The image capturing apparatus performs a correction process to generate an image signal DV1 that has been subjected to signal level or white balance adjustment and pixel defect correction. The image capturing apparatus performs a camera signal process on the image signal DV1 of the high-speed frame rate. In the camera signal process, not only contour correction, color correction, gamma correction, knee correction, and the like, but also image combination for converting an image signal of the high-speed frame rate into an image signal of the reference frame rate is performed, and an image signal DV2 of the reference frame rate is generated.

Further, the image capturing apparatus performs a display process to convert the image signal DV2 into a display image signal DH having a display resolution corresponding to that of the display unit 53. The image capturing apparatus performs the above processes to display a captured image on the screen of the display unit 53 even when the high-speed image capture mode is set. Further, if the image capturing apparatus outputs an output image signal DVout, the captured image can be displayed using an external device. Note that the image capturing apparatus is designed such that the frame rate is set higher than the reference frame rate, and aperture adjustment, focus adjustment, and white balance adjustment processes are performed for a frame period. Thus, the control accuracy and speed of them can be improved as compared with those in the standard image capture mode.

Next, when a captured image is recorded, the image capturing apparatus (image recording apparatus) performs an image compression process to generate a motion detection result, for example, a motion vector MV. In addition, the motion vector MV is set to reproduction control information RJ, or reproduction control information RJ is generated on the basis of the motion vector MV. In addition, the image capturing apparatus (image recording apparatus) performs a recording process to record an image signal of the high-speed frame rate and the reproduction control information RJ onto the recording media 62 in association with each other.

FIG. 12 illustrates a process when an image recorded on the recording media 62 by performing the process illustrated in FIG. 11 is reproduced. The image capturing apparatus (image reproducing apparatus) performs a reproduction process to read a desired image signal DV3 and reproduction control information RJ associated with the image signal from the recording media 62. The image capturing apparatus (image reproducing apparatus) performs a reproduction control process to cause the performance of a process of generating a slow motion image so that the frame rate of the image signal DV3 is controlled on the basis of the reproduction control information RJ to reduce the reproduction speed in accordance with an increase in motion of an object in a captured image and a process of generating a slow motion image in which blur of an object that moves a large amount is mitigated using a camera signal process. The image capturing apparatus (image reproducing apparatus) performs a camera signal process to generate an image signal DV4 of the reference frame rate, which has been subjected to processes such as contour correction, color correction, gamma correction, and knee correction, from the image signal DV3. Further, the image capturing apparatus (image reproducing apparatus) performs, when performing a camera signal process to convert the image signal DV3 into an image signal of the reference frame rate, image combination so that motion blur can be mitigated. In addition, the image capturing apparatus performs a display process to convert the image signal DV4 into an image signal having a display resolution corresponding to that of the display unit 53. The image capturing apparatus performs the above processes to display a reproduction image on the screen of the display unit 53. Further, if the image capturing apparatus (image reproducing apparatus) outputs an output image signal DVout, the reproduction image can be displayed using an external device.

Further, in a case where when the reproduction control information RJ associated with the desired image signal DV3 cannot be obtained, reproduction control for reducing the reproduction speed of a captured image in accordance with an increase in motion of an object or reproduction control for mitigating motion blur in a reproduction image is performed, the image capturing apparatus (image reproducing apparatus)

performs motion detection using the image signal DV3 in the reproduction control process, and causes the performance of a process of generating a slow motion image so that the frame rate of the image signal DV3 is controlled on the basis of an obtained motion vector to reduce the reproduction speed in accordance with an increase in motion of an object in a captured image or a process of generating a slow motion image in which blur of an object that moves a large amount is mitigated using a camera signal process.

Note that the control unit 81 of the image capturing apparatus (image reproducing apparatus) may be configured to control the operation of the recording/reproducing processing unit 61 so that image signals recorded on the recording media 62 are sequentially reproduced in accordance with a reproduction speed specified by a user. For example, in a case where a user specifies the 1× reproduction speed, the control unit 81 performs the reading of an image signal from the recording media 62 so that the frame rate of the image signal DV3 can be 240 [fps], sequentially performs image combination on four consecutive frames of the image signal DV3 using the camera signal processing unit 20, and performs conversion into an image signal of the reference frame rate, namely, 60 [fps]. Further, in a case where a user specifies the (½)× reproduction speed, the control unit 81 performs the reading of an image signal from the recording media 62 so that the frame rate of the image signal DV3 can be 120 [fps], sequentially performs image combines on four consecutive frames of the image signal DV3 using the camera signal processing unit 20, and performs conversion into an image signal of the reference frame rate, namely, 60 [fps]. Further, in a case where a user specifies the (¼)× reproduction speed, the control unit 81 performs the reading of an image signal from the recording media 62 so that the frame rate of the image signal DV3 can be equal to the reference frame rate, namely, 60 [fps].

Further, in a case where a user specifies fast-forward reproduction, that is, a reproduction speed more than 1×, the control unit 81 reads an image signal from the recording media 62 by performing decimation in accordance with the reproduction speed to generate an image signal of the reference frame rate which indicates an image having the specified reproduction speed. Also in this case, images of a plurality of consecutive frames may be combined to generate an image of one frame in fast-forward reproduction.

Next, an operation of mitigating motion blur in a reproduction image will be explained. In a case where image combination is performed on the image signal DV3 to convert the image signal DV3 into an image signal of the reference frame rate, for example, as illustrated in FIG. 5 described above, in a case where the images of the four frames a to d are combined to generate an image of one frame (a+b+c+d), a large amount of motion of an object can cause large difference in position of the object in the frames a to d. For this reason, if cyclic addition is performed by giving an equal weighting coefficient, an image of an object that moves a large amount is blurred. Therefore, a high-quality reproduction image cannot be obtained.

Accordingly, the control unit 81 determines a weighting coefficient selection value WS for generating weighting coefficients, which are different between frames, for a portion with a large amount of motion so that a plurality of frames to be subjected to cyclic addition contain a frame having a large weight and a frame which is temporally distant from this frame and which is given a small weight. The control unit 81 supplies the weighting coefficients to the weighting coefficient generation unit 212 of the image combining unit 21 in the camera signal processing unit 20.

FIG. 13 is a diagram for explaining an operation of generating a weighting coefficient selection value to be supplied from the control unit 81 to the weighting coefficient generation unit 212 of the image combining unit 21.

The control unit 81 determines a weighting coefficient selection value WS in accordance with the magnitude of motion which is obtained by performing motion detection using an image signal. For example, a motion vector MV obtained when the image compression/expansion unit 41 performs a compression process on the image signal DV1 is used to set a weighting coefficient selection value WS. Specifically, the absolute value of the motion amount of the motion vector MV (hereinafter referred to as a "motion-vector absolute value") MVm is compared with a threshold value, and a weighting coefficient selection value WS is determined in accordance with a comparison result. The threshold value may be implemented by a fixed value regardless of the number of frames to be subjected to image combination, or the number of threshold values may be changed in accordance with the number of frames to be subjected to image combination. For example, when the number of frames to be subjected to image combination is large, the number of threshold values is increased so that a multiplicity of weighting coefficients can be set in accordance with the motion-vector absolute value MVm.

Part (A) of FIG. 13 illustrates a weighting coefficient selection value WS obtained in a case where, for example, captured images which are captured at 240 [fps] are combined in units of four frames and combined images are reproduced at 60 [fps], that is, when the reproduction speed is set to 1×. Note that in part (A) of FIG. 13, two threshold values Mta1 and Mta2 are provided.

When the motion-vector absolute value MVm is less than the threshold value Mta1, the control unit 81 sets the weighting coefficient selection value WS to "Wa0". Further, when the motion-vector absolute value MVm is equal to or greater than the threshold value Mta1 and is less than the threshold value Mta2, the control unit 81 sets the weighting coefficient selection value WS to "Wa1". In addition, when the motion-vector absolute value MVm is equal to or greater than the threshold value Mtb2, the control unit 81 sets the weighting coefficient selection value WS to "Wa2".

Part (B) of FIG. 13 illustrates a weighting coefficient selection value WS obtained in a case where, for example, captured images which are captured at 240 [fps] are combined in units of two frames and combined images are reproduced at 60 [fps], that is, when the reproduction speed is set to (½)×. Note that in part (B) of FIG. 13, one threshold value Mtb1 is provided.

When the motion-vector absolute value MVm is less than the threshold value Mtb1, the control unit 81 sets the weighting coefficient selection value WS to "Wb0". Further, when the motion-vector absolute value MVm is equal to or greater than the threshold value Mtb1, the control unit 81 sets the weighting coefficient selection value WS to "Wb1".

Figures 14, 15:
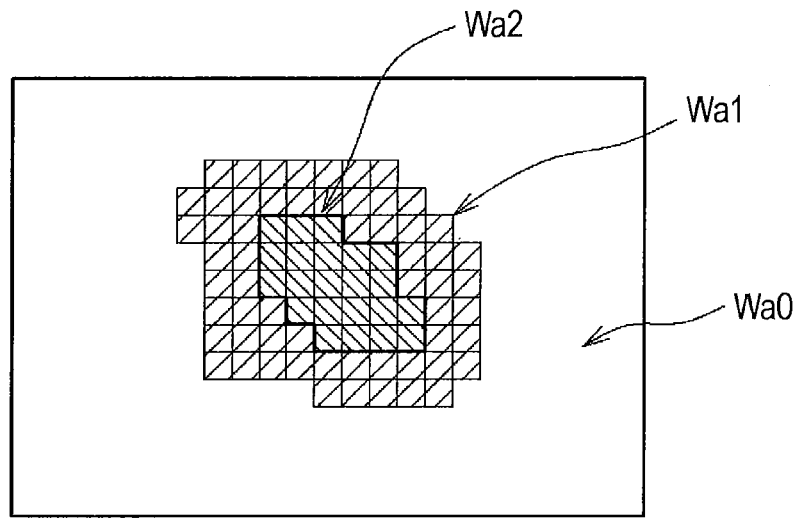
FIG. 14 is a diagram for explaining the relationship between an image signal and a weighting coefficient.
FIG. 15 is a diagram illustrating a weighting coefficient as an example.

Here, the motion vector MV is detected for each macroblock. Thus, as illustrated in FIG. 14, the control unit 81 sets a weighting coefficient selection value WS for each macroblock of the image signal DV3 in accordance with the motion-vector absolute value MVm. Note that in FIG. 14, a case is illustrated as an example where the amount of motion is small at a peripheral portion of the screen and where the closer to the center, the larger the amount of motion gradually becomes. The weighting coefficient selection value WS is set to "Wa0" for a macroblock in the peripheral portion of the screen, and the weighting coefficient selection value WS is set to "Wa1" for a macroblock in a portion closer to the center.

For a macroblock in the center, the weighting coefficient selection value WS is set to "Wa2".

The weighting coefficient generation unit 212 of the image combining unit 21 sequentially outputs weighting coefficients according to the weighting coefficient selection value WS for each frame within a period involved in image combination. FIG. 15 illustrates weighting coefficients as an example. In FIG. 15, "×1" shows weighting coefficients obtained in a case where captured images that are captured at, for example, 240 [fps] are subjected to image combination in units of four frames and a combined image is reproduced at 60 [fps], that is, when the reproduction speed is set to 1×. In this case, four frames are to be subjected to image combination. Thus, weighting coefficients are set for four frames a to d to be subjected to image combination.

Further, in FIG. 15, "×½" shows weighting coefficients obtained in a case where captured images that are captured at, for example, 240 [fps] are subjected to image combination in units of two frames and a combined image is reproduced at 60 [fps], that is, when the reproduction speed is set to (½)×. In this case, two frames are to be subjected to image combination. Thus, weighting coefficients are set for two frames a and b to be subjected to image combination.

The weighting coefficient generation unit 212 sets a weighting coefficient of "2" for the frames a, b, c, and d to be subjected to image combination when the weighting coefficient selection value WS is "Wa0", and sets a weighting coefficient of "2" for the frames a and b to be subjected to image combination when the weighting coefficient selection value WS is "Wb0". That is, images of portions with no motion or a small amount of motion are given an equal weight. Therefore, since an image signal obtained after cyclic addition is performed is changed to an image signal within a predetermined signal level range using the division circuit 214 even if noise is superimposed on an image of one of frames to be subjected to image combination, an image signal output from the image combining unit 21 is an image signal from which noise has been reduced in a portion with no motion or a portion with a small amount of motion.

When the weighting coefficient selection value WS is "Wa1", the weighting coefficient generation unit 212 sets weighting coefficients of "1, 1, 3, 3" for the frames a, b, c, and d to be subjected to image combination in the frame order. When the weighting coefficient selection value WS is "Wa2", the weighting coefficient generation unit 212 sets weighting coefficients of "1, 1, 2, 4" for the frames a, b, c, and d to be subjected to image combination in the frame order. Further, when the weighting coefficient selection value WS is "Wb1", the weighting coefficient generation unit 212 sets weighting coefficients of "1, 3" for the frames a and b to be subjected to image combination in the frame order. That is, weighting coefficients are set for a portion with a large amount of motion in such a manner that frames to be subjected to image combination contain a frame having a large weight and a frame which is temporally distant from this frame and which is given a small weight. Further, weighting coefficients are set for a portion with a larger amount of motion so that the difference in weight between a frame having a large weight and a temporally distant frame having a small weight becomes larger. For this reason, since a frame which is temporally distant from a frame given a large weight, that is, a frame in which the position of an object is largely different, is given a small weight, an image signal with reduced motion blur can be obtained as compared with a case where image combination is performed by giving an equal weight.

Note that only in a case where a user specifies a process of setting weighting coefficients which are different between frames for individual frames to be subjected to image combination so that motion blur can be reduced, the control unit 81 may execute the process. That is, normally, frames to be subjected to image combination may be given an equal weighting coefficient. Then, an image capture result obtained by performing image capture at a high speed may be reproduced with an image quality similar to that with which an image capture result obtained by performing image capture in the standard image capture mode is reproduced.

Further, the control unit 81 may be configured to execute a process of setting weighting coefficients which are different between frames for individual frames to be subjected to image combination in a portion with a large amount of motion during recording in the high-speed image capture mode so that the reproduction control information RJ can include a weighting coefficient selection value or weighting coefficients. In this case, weighting coefficients can be easily set during reproduction. For example, even an image reproducing apparatus having no function for setting a weighting coefficient from a motion vector MV can output an image signal of the reference frame rate in which motion blur has been reduced.

Further, the control unit 81 may be configured such that in a case where the reproduction control information RJ cannot be obtained during the reproduction of a captured image recorded on the recording media 62, the image compression/expansion unit 41 performs motion detection using the image signal DV3 and a weighting coefficient selection value WS is determined from a motion vector MV obtained by this motion detection.

Next, a case where the reproduction speed is controlled in accordance with motion of an object will be explained. In response to a user's instruction, the control unit 81 determines a recommended reproduction speed SR so that the reproduction speed can be reduced as the amount of motion of an object in a captured image increases, and displays this recommended reproduction speed SR on the display unit 53 in an on-screen display manner. Further, in a case where a user instructs reproduction at the recommended reproduction speed SR, the control unit 81 controls the operation of the individual portions so that an image signal DV4 having the recommended reproduction speed SR can be generated. In addition, the control unit 81 detects a motion of a background on which motion due to camera works such as panning and tilting has no influence, and calculates the magnitude of relative motion of an object with respect to the background using this motion of the background to determine a recommended reproduction speed SR in accordance with the calculated magnitude of relative motion of the object.

Figure 16:
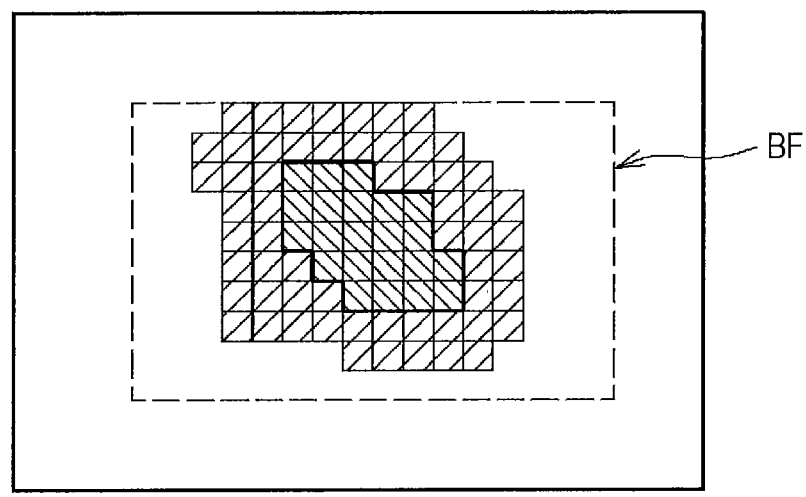
FIG. 16 is a diagram for use in the explanation of motion detection of an object.

FIG. 16 is a diagram for explaining a process of determining a recommended reproduction speed. The control unit 81 sets a frame BF on a captured image so that the motion of the background and the motion of a desired object can be distinguished from each other, and separates the captured image into a center portion where the desired object is located and a peripheral portion b corresponding to a background portion. Further, the control unit 81 produces the absolute value of a motion vector MV detected using an image signal of the captured image, and calculates a motion-vector absolute value MVm indicating the magnitude of motion. Next, the control unit 81 separates the motion-vector absolute value MVm into parts inside and outside the frame BF and performs addition. Then, the control unit 81 subtracts an absolute value sum obtained by adding motion-vector absolute values MVm outside the frame BF from an absolute value sum obtained by adding motion-vector absolute values MVm inside the frame BF as given in Equation (1) to calculate a decision value MU indicating the magnitude of relative motion of the desired object with respect to the background.

$$MU=\Sigma(\text{motion-vector absolute values for individual macroblocks within the frame})-\Sigma(\text{motion-vector absolute values for individual macroblocks outside the frame}) \quad (1)$$

Figure 17:
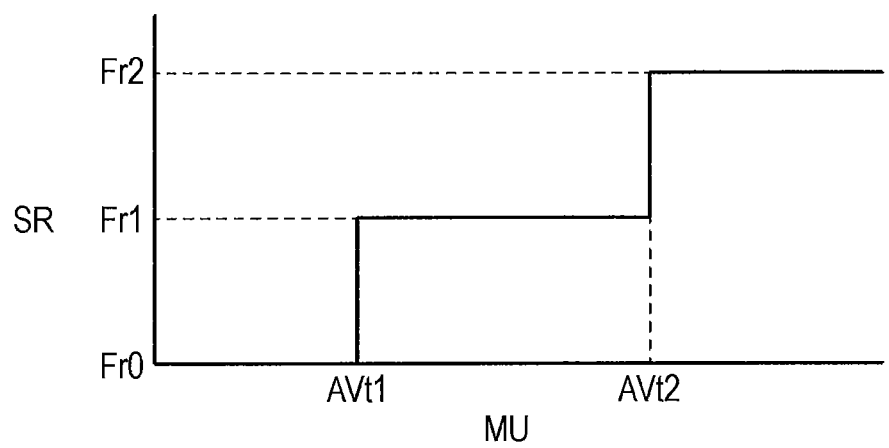
FIG. 17 is a diagram illustrating the relationship between a decision value and a recommended reproduction speed.

Next, the control unit 81 compares the decision value MU with threshold values AVt1 and AVt2, and determines a recommended reproduction speed SR on the basis of a comparison result. FIG. 17 is a diagram illustrating the relationship between a decision value and a recommended reproduction speed.

When the decision value MU is less than the threshold value AVt1, the control unit 81 sets the recommended reproduction speed SR to "Fr0" which is 1× (×1). Further, when the decision value MU is equal to or greater than the threshold value AVt1 and is less than the threshold value AVt2, the control unit 81 sets the recommended reproduction speed SR to "Fr1". In addition, when the decision value MU is equal to or greater than the threshold value AVt2, the control unit 81 the control unit 81 sets the recommended reproduction speed SR to "Fr2". Here, in a case where the image signal DV1 of the high-speed frame rate has 240 [fps] and the reference frame rate is 60 [fps], when the recommended reproduction speed SR is "Fr2", the control unit 81 sets the reproduction speed for which the reading of an image signal from the recording media 62 is performed so that the frame rate of the image signal DV3 can be 60 [fps] and for which the image signal DV3 is processed without being subjected to image combination to produce an image signal of a reproduction image, that is, (¼)×, as the recommended reproduction speed SR. Further, when the recommended reproduction speed SR is "Fr1", for example, the control unit 81 sets an intermediate value between the 1× and (¼)×, namely, (½)×, as the recommended reproduction speed SR.

If the recommended reproduction speed SR is set in this manner, the 1× reproduction speed is obtained when the magnitude of relative motion of the object with respect to the background is small, and the reproduction speed is reduced in accordance with an increase in motion. For this reason, if reproduction is performed at the recommended reproduction speed SR, the reproduction speed can be automatically changed in such a manner that a motion reproduction image in which the object slowly moves can be obtained when the amount of motion of the object with respect to the background is large while the motion of the object can follow the actual motion when the amount of motion of the object is small. Therefore, it is not necessary for a user to perform an operation of switching to the slow motion reproduction operation when the amount of motion of the object is large so that the user can check the motion of the object using video played in slow motion and switching to 1× speed reproduction when the amount of motion of the object becomes small. Thus, user usability can be significantly improved.

Further, the control unit 81 may execute the setting of the recommended reproduction speed SR during recording in the high-speed image capture mode so that the reproduction control information RJ can include the recommended reproduction speed SR. In this case, the recommended reproduction speed SR can be easily set during reproduction. For example, even an image reproducing apparatus having no function for setting a recommended reproduction speed SR from a motion vector MV can automatically change the reproduction speed in accordance with motion of an object.

Further, the control unit 81 may also execute the setting of the recommended reproduction speed SR during the reproduction of an image recorded in the high-speed image capture mode. In this case, during recording in the high-speed image capture mode, the control unit 81 records the reproduction control information RJ on the recording media 62 in correspondence with the image signal DV1 so that the reproduction control information RJ can include the recommended reproduction speed SR. Further, during the reproduction of an image recorded in the high-speed image capture mode, the control unit 81 reads an image signal and the reproduction control information RJ corresponding to the image signal, and controls the frame rate to be supplied to the camera signal processing unit 20 so that the recommended reproduction speed SR indicated by this reproduction control information RJ can be obtained.

Further, the control unit 81 may be configured such that in a case where the reproduction control information RJ cannot be obtained during the reproduction of the captured image recorded on the recording media 62, the image compression/expansion unit 41 performs motion detection using the image signal DV3 and the recommended reproduction speed SR is determined from a motion vector MV obtained by this motion detection to control the reproduction speed of the captured image.

Figure 18:
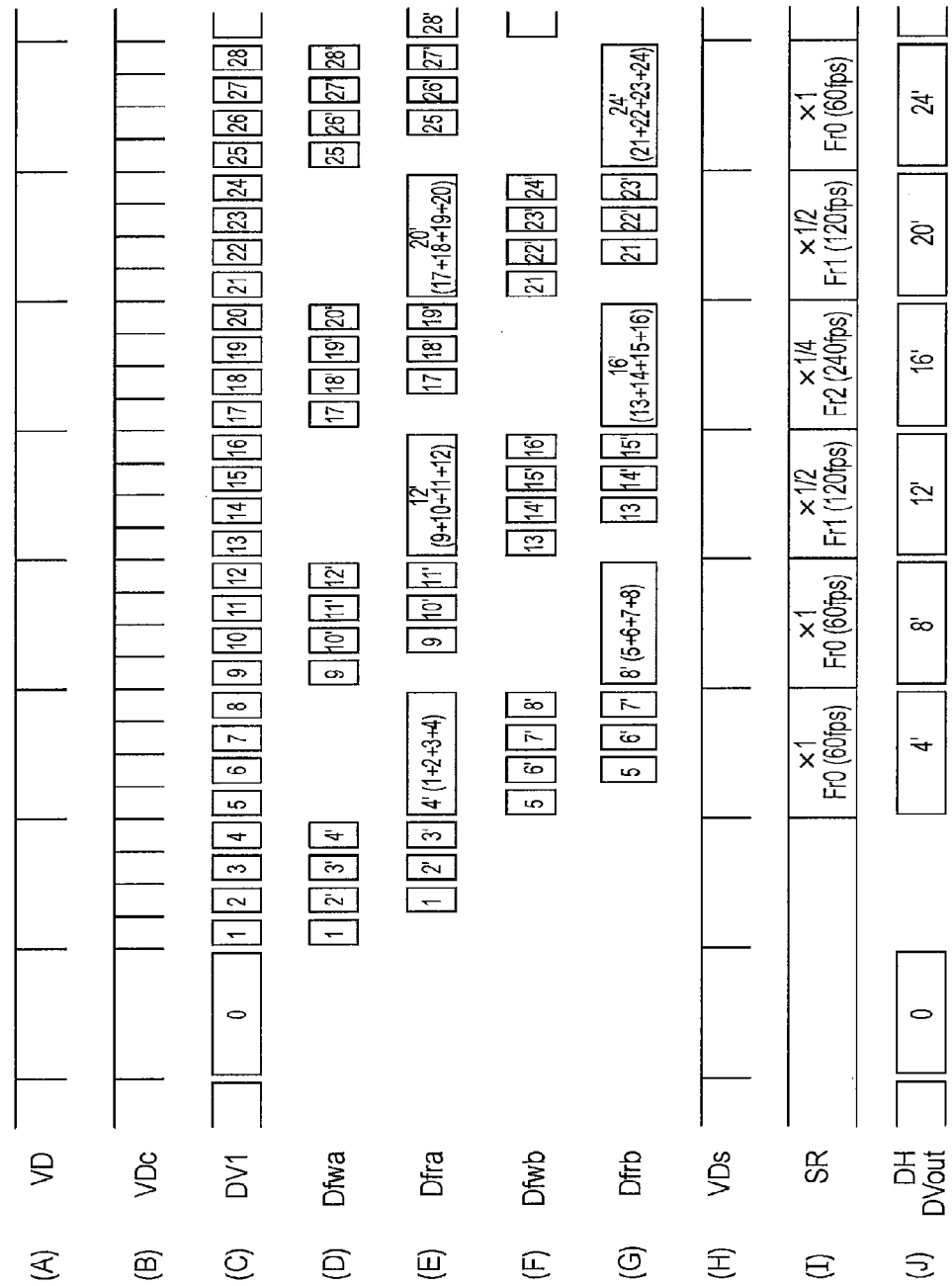
FIG. 18 is a timing chart when a captured image is recorded in the high-speed image capture mode.

FIG. 18 is a time chart illustrating an operation when an image signal is recorded using the image capturing apparatus 10 and the image recording apparatus 91. Note that in FIG. 18, a case is illustrated where a recommended reproduction speed SR is determined on the basis of a motion vector MV and where reproduction control information RJ including this recommended reproduction speed SR is recorded in correspondence with the image signal.

Part (A) of FIG. 18 is a vertical synchronization signal VD of the reference frame rate, namely, 60 [fps]. Part (B) of FIG. 18 is a vertical synchronization signal VDc used by the image capturing unit 12 to generate an image signal DV1. The image capturing apparatus 10 causes the image sensor 121, the AFE 122, the ADC 123, the correction processing unit 124, and the detection unit 71 to operate in synchronization with the vertical synchronization signal VDc to generate an image signal DV1 illustrated in part (C) of FIG. 18. Note that in part (C) of FIG. 18, consecutive numbers represent individual frames.

Part (H) of FIG. 18 is a vertical synchronization signal VDs of the reference frame rate on which the operations performed in the camera signal processing unit 20, the image compression/expansion unit 41, the image output unit 51, the display processing unit 52, and the display unit 53 are based. Further, vertical synchronization signals VDh and VDs are assumed to be signals synchronized with the vertical synchronization signal VD.

In the standard image capture mode, the image capturing unit 12 generates a signal of frame "0" of the image signal DV1 synchronized with the vertical synchronization signal VDc which is set at the reference frame rate. Since the image signal DV1 is set at the reference frame rate, the camera signal processing unit 20 performs camera signal processes other than image combination. The signal of frame "0" of an image signal DV2 output from this camera signal processing unit 20 is supplied to the display unit 53 through the display processing unit 52. Accordingly, as illustrated in part (J) of FIG. 18, a display image signal DH to be supplied to the display unit 53 or an output image signal DVout from the image output unit 51 shows an image of frame "0".

In the high-speed image capture mode, the image capturing unit 12 generates signals of frames "1", "2", . . . of the image signal DV1 synchronized with the vertical synchronization signal VDc of 240 [fps], which is four times 60 [fps]. Since the image signal DV1 is set at the high-speed frame rate, the camera signal processing unit 20 performs image combination and performs conversion into an image signal of the reference frame rate.

Parts (D) to (G) of FIG. 18 are signals for explaining image combination performed by the image combining unit 21 of the camera signal processing unit 20. Part (D) of FIG. 18 illustrates an image signal Dfwa to be written in the bank 312a of the frame memory unit 31, part (E) of FIG. 18 illustrates an image signal Dfra to be read from the bank 312a of the frame memory unit 31, part (F) of FIG. 18 illustrates an image signal Dfwb to be written in the bank 312b of the frame memory unit 31, and part (G) of FIG. 18 illustrates an image signal Dfrb to be read from the bank 312b of the frame memory unit 31.

The image combining unit 21 stores the signal of frame "1" in the bank 312a. For the next frame, the image combining unit 21 reads the signal of frame "1" stored in the bank 312a and adds it to the signal of frame "2". Then, a signal of cyclic-addition frame "2'" is stored in the bank 312a. Note that in parts (D) to (G) of FIG. 18, a cyclic-addition frame that has been subjected to image combination is represented by a number with the "'" symbol.

In this manner, the image combining unit 21 performs image combination using cyclic addition. When image combination for a reference frame period is completed, that is, when the signal of cyclic-addition frame "4'" obtained by performing cyclic addition on frames "1" to "4" is stored in the bank 312a, the image combining unit 21 switches the writing of an image signal from the bank 312a to the bank 312b. Further, the image combining unit 21 reads a signal obtained after image combination for four frames which is stored in the bank 312a, while returning the signal to a signal within a predetermined level range using the division circuit, in synchronization with the vertical synchronization signal VDs, and performs a camera signal process such as contour correction. Thereafter, a resulting signal is supplied to the image output unit 51 or the display unit 53 through the display processing unit 52.

The image combining unit 21 stores the signal of frame "5" in the bank 312b. For the next frame, the image combining unit 21 reads the signal of frame "5" stored in the bank 312b and adds it to the signal of frame "6". Then, the image combining unit 21 stores a signal of cyclic-addition frame "6'" in the bank 312b. When the signal of cyclic-addition frame "8'" obtained by performing cyclic addition on frames "5" to "8" is stored in the bank 312b, the image combining unit 21 switches the bank in which an image signal is to be written to the bank 312a. Then, the image combining unit 21 reads a signal obtained after image combination for four frames which is stored in the bank 312b, while returning the signal to a signal within a predetermined signal level range using the division circuit, for a reference frame period, and performs a process such as contour correction. Thereafter, a resulting signal is supplied to the image output unit 51 or the display unit 53 through the display processing unit 52. Subsequently, processing is performed in a similar manner. Then, as illustrated in part (J) of FIG. 18, even in the high-speed image capture mode, an image can be displayed or output at the reference frame rate.

Further, during a recording operation, the control unit 81 records an image signal generated in the standard image capture mode, for example, the signal of frame "0", on the recording media 62 after performing a compression process, and records an image signal generated in the high-speed image capture mode, for example, the signals of frames "1", "2", . . . , on the recording media 62 without performing a camera signal process or a compression process.

In addition, in the high-speed image capture mode, the control unit 81 causes the image compression/expansion unit 41 to process an image signal output from the camera signal processing unit 20 to determine the recommended reproduction speed SR illustrated in part (I) of FIG. 18 on the basis of motion information generated by the image compression/expansion unit 41. Then, the control unit 81 records reproduction control information RJ including this recommended reproduction speed SR on the recording media 62 in correspondence with an image signal generated in the high-speed image capture mode. Note that in a case where a weighting coefficient is set during reproduction although it is not illustrated in the figure, the weighting coefficient selection value WS is included in the reproduction control information RJ and is recorded on the recording media 62 in correspondence with the image signal.

FIG. 19 is a time chart illustrating an operation when an image recorded on the recording media 62 is generated using the image capturing apparatus 10 and the image reproducing apparatus 90. Note that in FIG. 19, a case is illustrated where a user has instructed reproduction at the recommended reproduction speed.

Part (A) of FIG. 19 is a vertical synchronization signal VD of the reference frame rate, namely, 60 [fps]. Part (B) of FIG. 19 illustrates a recommended reproduction speed SR read together with an image signal from the recording media 62. Part (C) of FIG. 19 illustrates a vertical synchronization signal VDr of an image signal to be read from the recording media 62. Further, part (I) of FIG. 19 is a vertical synchronization signal VDs of the reference frame rate on which the operations performed in the camera signal processing unit 20, the image compression/expansion unit 41, the image output unit 51, the display processing unit 52, and the display unit 53 are based.

When the read recommended reproduction speed SR is "Fr0" which is 1× (×1), the control unit 81 sets the image signal DV3 at the frame rate during recording, that is, the image signal DV3 at 240 [fps], and supplies the image signal DV3 to the camera signal processing unit 20. Part (D) of FIG. 19 illustrates the image signal DV3.

Since the image signal DV3 has been recorded in the high-speed image capture mode, the control unit 81 causes the camera signal processing unit 20 to perform image combination to generate an image signal of the reference frame rate.

Parts (E) to (H) of FIG. 19 are signals for explaining image combination performed by the image combining unit 21 of the camera signal processing unit 20. Part (E) of FIG. 19 illustrates an image signal Dfwa to be written in the bank 312a of the frame memory unit 31, part (F) of FIG. 19 illustrates an image signal Dfra to be read from the bank 312a of the frame memory unit 31, part (G) of FIG. 19 illustrates an image signal Dfwb to be written in the bank 312b of the frame memory unit 31, and part (H) of FIG. 19 illustrates an image signal Dfrb to be read from the bank 312b of the frame memory unit 31.

The image combining unit 21 performs image combination in the manner described above. When image combination for a reference frame period is completed, that is, when the signal of cyclic-addition frame "4'" obtained by performing image combination on frames "1" to "4" is stored in the bank 312a, the image combining unit 21 switches the bank in which an image signal is to be written from the bank 312a to the bank 312b. Further, in image combination, weighting coefficients are set in accordance with motion information, and frames to be subjected to cyclic addition are weighted using the set weight coefficients. Further, the image combining unit 21 reads a signal obtained after image combination for four frames which is stored in the bank 312a, while returning the signal to a signal within a predetermined level range using the division circuit, in synchronization with the vertical synchronization signal VDs, and performs a camera signal process such as contour correction. Thereafter, a resulting signal is supplied to the image output unit 51 or the display unit 53 through the display processing unit 52. Part (J) of FIG. 19 illustrates a display image signal DH to be supplied to the display unit 53 or an output image signal DVout from the image output unit 51.

Next, when the read recommended reproduction speed SR is "Fr1 (×½)" which is (½)×, the control unit 81 sets the image signal DV3 at a frame rate which is (½) times that during recording, that is, the image signal DV3 at 120 [fps], and supplies the image signal DV3 to the camera signal processing unit 20. Also at this time, since the frame rate of the image signal DV3 is higher than the reference frame rate, the control unit 81 causes the camera signal processing unit 20 to perform image combination to generate an image signal of the reference frame rate.

That is, the image combining unit 21 stores the signal of frame "9" in the bank 312a. For the next frame, the image combining unit 21 reads the signal of frame "9" stored in the bank 312a and adds it to the signal of frame "10". Then, a signal of cyclic-addition frame "10'" is stored in the bank 312a.

When image combination for a reference frame period is completed, that is, when the signal of cyclic-addition frame "10'" obtained by performing image combination on frames "9" and "10" is stored in the bank 312a, the image combining unit 21 switches the bank in which an image signal is to be written from the bank 312a to the bank 312b. Further, the image combining unit 21 reads a signal obtained after image combination for two frames which is stored in the bank 312a, while returning the signal to a signal within a predetermined level range using the division circuit, in synchronization with the vertical synchronization signal VDs, and performs a process such as contour correction. Thereafter, a resulting signal is supplied to the image output unit 51 or the display unit 53 through the display processing unit 52.

Next, when the read recommended reproduction speed SR is "Fr2 (×¼)" which is (¼)×, the control unit 81 sets the image signal DV3 at a frame rate which is (¼) times that during recording, that is, the image signal DV3 at 60 [fps], and supplies the image signal DV3 to the camera signal processing unit 20. At this time, since the frame rate of the image signal DV3 is the reference frame rate, the control unit 81 supplies the image signal DV3 to the image output unit 51 or the display unit 53 through the display processing unit 52 after performing a camera signal process such as contour correction, without performing image combination, using the camera signal processing unit 20. Note that the camera signal processing unit 20 is configured such that when image combination is performed, image signals for which image combination for a reference frame period has been performed are read for the next reference frame period. Thus, a signal obtained after image combination is delayed one frame with respect to the image signal DV3. Therefore, when the image signal DV3 has the reference frame rate, the control unit 81 controls the image signal DV3 to be written in the bank 312a or the bank 312b and the written image signal to be read for the next reference frame period. Even when the recommended reproduction speed SR is switched, the reproduction of an image is sequentially performed using the image signal DV3 of each frame.

In this manner, if the reproduction operation is performed at the recommended reproduction speed SR, the image signal DV3 is subjected to image combination in units of four frames when the amount of motion is small to produce an image of the reference frame rate. Therefore, the image to be displayed or output can automatically be a 1× reproduction image. Further, in accordance with an increase in motion, the frame rate of the image signal DV3 is reduced and the number of frames to be subjected to image combination is also reduced. Therefore, the image to be displayed or output can automatically be a slow motion reproduction image.

Further, the control unit 81 sets an equal weighting coefficient when the amount of motion is small, and sets weighting coefficients which are different between frames to be subjected to image combination so that motion blur caused by image combination can be reduced when the amount of motion is large. Therefore, a section with a small amount of motion is an image with noise reduced, and a section with a large amount of motion is an image with reduced blur even if image combination is performed.

Figure 20:
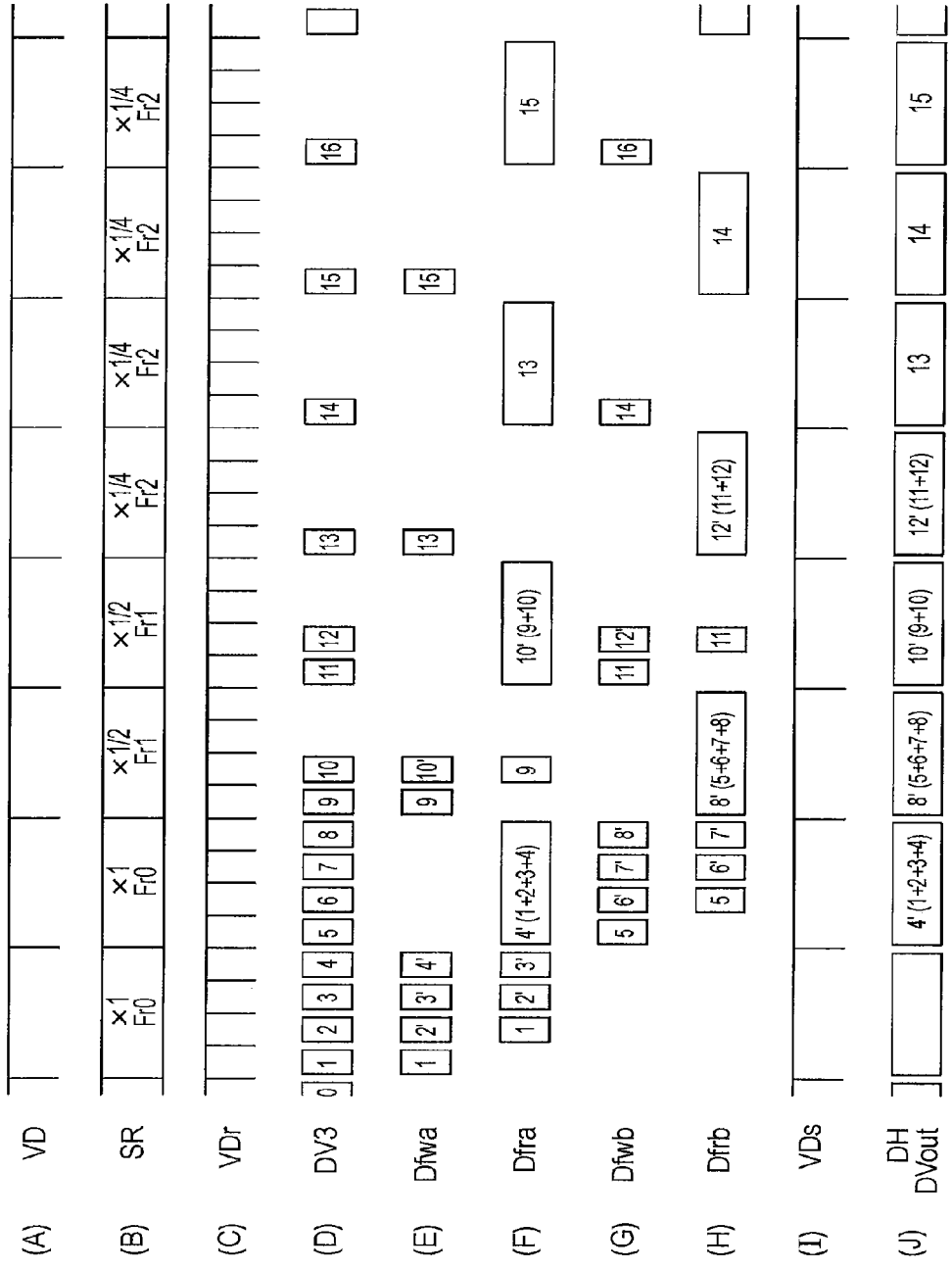
FIG. 20 is a timing chart when motion detection is performed and reproduction control is performed when the captured image recorded in the high-speed image capture mode is reproduced.

FIG. 20 illustrates a timing chart in case where motion detection is performed using an image signal read from the recording media 62, a recommended reproduction speed is set, and a user instructs reproduction at this recommended reproduction speed.

Part (A) of FIG. 20 is a vertical synchronization signal VD of the reference frame rate, namely, 60 [fps]. Part (B) of FIG. 20 illustrates a vertical synchronization signal VDr of an image signal read from the recording media 62, and the vertical synchronization signal VDr is set at a frame period of 240 [fps] which is the frame rate of the recorded image signal. Further, part (I) of FIG. 20 is a vertical synchronization signal VDs of the reference frame rate on which the operations performed in the camera signal processing unit 20, the image compression/expansion unit 41, the image output unit 51, the display processing unit 52, and the display unit 53 are based.

Part (D) of FIG. 20 illustrates an image signal DV3 to be supplied to the camera signal processing unit and the image compression/expansion unit 41, and part (C) of FIG. 20 illustrates a recommended reproduction speed SR that is determined by performing motion detection using the image signal DV3.

The recording/reproducing processing unit 61 performs the reading of an image signal from the recording media 62, and supplies, in synchronization with the vertical synchronization signal VD and the vertical synchronization signal VDr, an image signal DV3 for one frame as an image signal of a frame of interest to the camera signal processing unit 20 and the image compression/expansion unit 41. The image compression/expansion unit 41 performs motion detection using the image signal of the frame of interest supplied in synchronization with the vertical synchronization signals VD and VDr and an image signal of a reference frame which is, for example, one frame previous to this frame, and detects a motion vector MV. The control unit 81 determines a recommended reproduction speed SR and a weighting coefficient selection value WS of a reference frame period including this frame of interest on the basis of the detected motion vector MV.

For example, the image compression/expansion unit 41 performs motion detection using the image signal of frame "1" which is the frame of interest and the image signal of frame "0" which is the reference frame, and detects a motion vector MV. The control unit 81 determines a recommended reproduction speed SR of a reference frame period including frame "1" on the basis of this motion vector MV. Here, when a decision value MU calculated on the basis of the detected motion vector MV is less than the threshold value AVt1, the control unit 81 sets the recommended reproduction speed SR of the reference frame period including frame "1" to "Fro" which is 1× (×1). Since image combination of four frames of the image signal DV3 is performed for 1×, the control unit 81 controls the recording/reproducing processing unit 61 to supply the image signals of the three frames subsequent to frame "1" to the camera signal processing unit 20 and the image compression/expansion unit 41.

Parts (E) to (H) of FIG. 20 are signals for explaining image combination performed by the image combining unit 21 of the camera signal processing unit 20. Part (E) of FIG. 20 illustrates an image signal Dfwa to be written in the bank 312a of the frame memory unit 31, part (F) of FIG. 20 illustrates an image signal Dfra to be read from the bank 312a of the frame memory unit 31, part (G) of FIG. 20 illustrates an image signal Dfwb to be written in the bank 312b of the frame memory unit 31, and part (H) of FIG. 20 illustrates an image signal Dfrb to be read from the bank 312b of the frame memory unit 31.

The image combining unit 21 performs image combination in the manner described above. When image combination for a reference frame period is completed, that is, when the signal of cyclic-addition frame "4'" obtained by performing image combination on frame "1" to "4" is stored in the bank 312a, the image combining unit 21 switches the bank in which an image signal is to be written from the bank 312a to the bank 312b. Further, in image combination, weighting coefficients are set in accordance with a weighting coefficient selection value WS determined on the basis of a detected motion vector, and frames to be subjected to cyclic addition are weighted with the set weight coefficients. Further, the image combining unit 21 reads a signal obtained after image combination for four frames which is stored in the bank 312a, while returning the signal to a signal within a predetermined level range using the division circuit, in synchronization with the vertical synchronization signal VDs for the next reference frame period, and performs a process such as contour correction. Thereafter, a resulting signal is supplied to the image output unit 51 or the display unit 53 through the display processing unit 52. Part (J) of FIG. 20 illustrates a display image signal DH to be supplied to the display unit 53 or an output image signal DVout to be output from the image output unit 51. Note that when the weighting coefficient selection value WS is determined, the image signal of the first frame to be subjected to cyclic addition has already been stored in a bank. For this reason, if an equal coefficient is given t,o the first frame in motion coefficients that are selected in accordance with the weighting coefficient selection value WS, motion coefficients for the second and subsequent frames can be adjusted and motion blur can be mitigated. For example, in FIG. 15, it is assumed that coefficients of "1, 1, 1, 1" are set when the weighting coefficient selection value WS is "Wa0". In the division circuit 214 illustrated in FIG. 4, when the weighting coefficient selection value WS is "Wa0", the signal level of the image signal supplied from the frame memory unit 31 is multiplied by (¼). This would allow the coefficient for the frame a to be set to "1" when the weighting coefficient selection value WS is either of "Wa0", "Wa1", and "Wa2". Thus, even if the image signal of the first frame to be subjected to cyclic addition has already been stored in a bank, noise in a portion with no motion or a portion with a small amount of motion, or motion blur in a portion with a large amount of motion can be reduced.

Next, motion detection is performed using the image signal of frame "5" which is the frame of interest and the image signal of frame "4" which is the reference frame, and the recommended reproduction speed SR of a reference frame period including frame "5" is determined to be "Fro" which is 1× (×1) on the basis of the detected motion vector MV. Then, cyclic addition for four frames is performed using the bank 312b, and the generation of the display image signal DH or the output of the output image signal DVout is performed.

Next, motion detection is performed using the image signal of frame "9" which is the frame of interest and the image signal of frame "8" which is the reference frame, and a recommended reproduction speed SR of a reference frame period including frame "8" is determined on the basis of the detected motion vector MV. Here, when the decision value MU is equal to or greater than the threshold value AVt1 and is less than the threshold value AVt2, the recommended reproduction speed SR of the reference frame period including frame "8" is set to "Fr1" which is (½)× "×½". Since image combination of two frames of the image signal DV3 is performed for (½)×, the control unit 81 controls the recording/reproducing processing unit 61 to supply the image signal for one frame subsequent to frame "8" to the camera signal processing unit 20 and the image compression/expansion unit 41.

The image combining unit 21 performs image combination. When image combination for a reference frame period is completed, that is, when the signal of clic-addition frame "10'" obtained by performing image combination on frames "9" and "10" is stored in the bank 312a, the image combining unit 21 switches the bank in which an image signal is to be written from the bank 312a to the bank 312b. In image combination, frames to be subjected to cyclic addition are weighted with weighting coefficients that are set in accordance with a weighting coefficient selection value WS determined on the basis of a detected motion vector. Further, the image combining unit 21 reads a signal obtained after image combination for two frames which is stored in the bank 312a, while returning the signal to a signal within a predetermined level range using the division circuit, in synchronized with the vertical synchronization signal VDs for the next reference frame period, and performs a process such as contour correction. Thereafter, a resulting signal is supplied to the image output unit 51 or the display unit 53 through the display processing unit 52.

Further, motion detection is performed using the image signal of frame "13" which is the frame of interest and the image signal of frame "12" which is the reference frame. When the decision value MU based on the detected motion vector MV is equal to or greater than the threshold value AVt2, the recommended reproduction speed SR of a reference frame period including frame "13" is set to "Fr2" which is (¼)× "×¼". Since image combination for the image signal DV3 is not performed for (¼)×, the image signal of frame "13" which is stored in the bank 312a is read in synchronization with the vertical synchronization signal VDs for the next reference frame period, and is subjected to a camera signal process such as contour correction. Thereafter, a resulting signal is supplied to the image output unit 51 or the display unit 53 through the display processing unit 52.

In this manner, motion detection is performed using an image signal read from the recording media 62, and the recommended reproduction speed SR or the weighting coefficient selection value WS is determined on the basis of a motion detection result. Thus, even if reproduction control information RJ has not been recorded on the recording media 62, image combination can be performed on the image signal DV3 in units of four frames when the amount of motion is small, and an image of the reference frame rate is obtained. Therefore, the image to be displayed or output can automatically be a 1× reproduction image. Further, in accordance with an increase in motion, the frame rate of the image signal DV3 is reduced and the number of frames to be subjected to image combination is also reduced. Therefore, the image to be displayed or output can automatically be a slow motion reproduction image.

Further, when the amount of motion is small, image combination is performed by giving an equal weighting coefficient. When the amount of motion is large, weighting coefficients which are different between frames to be subjected to image combination are set so that motion blur can be reduced in an image obtained after combination. Therefore, a section with a small amount of motion in a reproduction image is an image with noise reduced, and a section with a large amount of motion is an image with reduced blur even if image combination is performed.

According to the embodiment described above, therefore, a recommended reproduction speed is determined in accordance with motion of an object in a captured image. Thus, if reproduction is performed at the recommended reproduction speed, when the amount of motion of an object is large, the reproduction speed is automatically reduced and a slow motion reproduction image is displayed without causing a user to search for a position where a captured image with a large amount of motion of an object is recorded and perform slow motion reproduction. User convenience can be improved.

Further, if a recording operation in the high-speed image capture mode is started beforehand so that a slow motion reproduction image having a high time resolution can be obtained without missing an image capturing opportunity, in a case where a slow motion reproduction image is obtained by reducing the reproduction speed of a captured image recorded in the high-speed image capture mode, the waiting time for an image with a desired motion to be displayed in slow motion becomes significantly long. However, according to this invention, when the amount of motion is small, reproduction is performed at, for example, 1× speed. When the amount of motion is large, the reproduction speed is automatically reduced, resulting in a slow motion reproduction image. This can prevent the waiting time for an image with a desired motion to be displayed in slow motion from being long.

Further, image signals for a reference frame period are weighted in accordance with motion of an image and are subjected to an addition process so that an image signal of the high-speed frame rate is converted into an image signal of the reference frame rate. Thus, a high-quality slow motion image in which the SN ratio of a still portion or a portion with a small amount of motion is improved and in which blur is prevented from occurring in a portion with a large amount of motion can be obtained.

Further, a motion vector is determined using motion detection, and a weight or a recommended reproduction speed is determined in accordance with the motion amount of this motion vector. Thus, a weight or a recommended reproduction speed can easily and reliably be determined.

Further, in the image capturing apparatus described above, in the standard image capture mode, the image signal DV1 is subjected to a compression process and stored in recording media. Thus, the amount of signal of a captured image to be recorded can be saved. Further, reproduction control information RJ is generated from a motion vector obtained by the image compression/expansion unit 41 that performs a compression process on the image signal DV1. Thus, it is not necessary to separately provide a motion detection unit for generating the reproduction control information RJ. Thus, simplification in configuration of the image capturing apparatus as well as cost reduction can be achieved.

Note that the image capturing apparatus described above is not limited to that for performing recording and reproduction of a captured image. For example, an image signal of a high-speed frame rate and reproduction control information RJ may be output from the image output unit 51 in association with each other.

Further, in the image capturing apparatus described above, a case has been illustrated where a camera signal process or a compression process is performed using an image signal of a reference frame rate. However, in a case where a camera signal processing unit or an image compression/expansion unit has high processing capabilities so that a camera signal process or a compression process can be performed using an image signal of a high-speed frame rate, an image signal of a high-speed frame rate that has been subjected to a camera signal process, or this signal may be subjected to a compression process, may be recorded on the recording media 62 or output from the image output unit 51.

Further, in the embodiment described above, a motion vector generated when the image compression/expansion unit 41 performs a compression process is used as a result of motion detection of an object. However, motion detection can be performed using a wide variety of methods such as, for example, a method of determining the magnitude of variance with respect to the average amount of motion on a screen.

Figure 21:
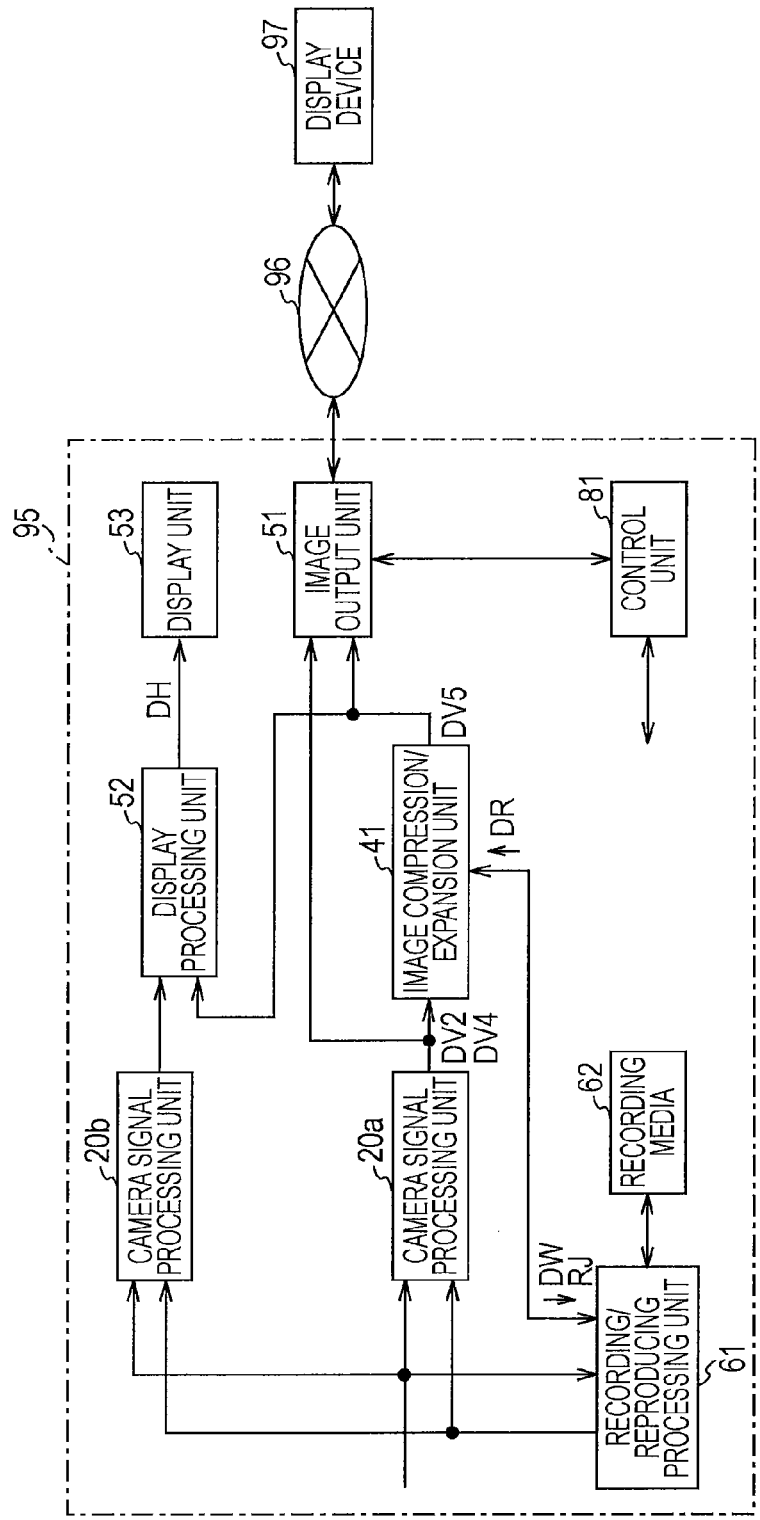
FIG. 21 is a diagram illustrating the structure of another embodiment.

FIG. 21 is a block diagram illustrating another embodiment of the present invention. An image capturing apparatus 95 is provided with two systems of camera signal processing units 20a and 20b for monitoring and external output. The image capturing apparatus 95 is constructed in the same manner as that of the image capturing apparatus 10, except that the configuration regarding the two systems of camera signal processing units 20a and 20b is different.

The image capturing apparatus 95 is connected to a display device 97 via, for example, a home network 96. In the image capturing apparatus 95, a control unit 81 performs data communication at the time of connection through an image output unit 51 to detect an allowable maximum frame rate (frame frequency) of the input of the display device 97. Note that the detection of the maximum frame rate is executed by obtaining reproduction control information regarding the display device 97 from the display device 97 in a data communication process between the image capturing apparatus 95 and the display device 97 which is executed at the time of connection.

The control unit 81 switches the frame rate of image signals DV2b and DV4b output from the camera signal processing unit 20b for external output so that an image signal of this obtained maximum frame rate can be output from the image output unit 51.

That is, in a case where the maximum frame rate in the display device 97 is 60 [fps] (the maximum frame frequency is 60 [Hz]), the operation of the camera signal processing unit 20b is controlled in the same manner as that of the camera signal processing unit 20 to output image signals DV2b and DV4b of 60 [fps].

In a case where the maximum frame rate in the display device 97 is 120 [fps], for an image signal DV3 reproduced from the recording media 62 at 240 [fps] and an image signal DV1 obtained in the high-speed image capture mode, cyclic addition of two consecutive frames is performed and generated image signals DV2b and DV4b of 120 [fps] are output to the display device 97.

Further, for an image signal DV3 reproduced from the recording media 62 at 120 [fps], the frame rate is not reduced, and the image signal DV3 is processed using the camera signal processing unit 20b and is output to the display device 97. Further, for an image signal DV3 reproduced from the recording media 62 at 60 [fps] or an image signal DV1 output from the image capturing unit 12 in the standard image capture mode, an image signal of an identical frame is repeatedly output alternately using the banks 312*a* and 312*b* to up-convert the image signal DV3 to 120 [fps], and the resulting image signal is output to the display device 97.

Note that the up-conversion process can be implemented by, instead of performing a process of simply repeating an identical frame, using a wide variety of techniques such as the case of performing frame interpolation based on motion compensation using a motion vector. Further, instead of up-conversion, the operation of the image capturing unit 12 may be switched to generate an image signal DV1 of 120 [fps].

The camera signal processing unit 20*a* on the monitoring side receives an image signal DV3 reproduced from the recording media 62, and outputs the image signal DV3 at 60 [fps] which is the frame rate supported by the display processing unit 52 and the display unit 53.

Note that, instead of providing two systems of camera signal processing units themselves, two systems of only image combining units 21 may be provided. In this case, however, a gamma process and the like are first executed and, finally, an image combination process is executed.

In this manner, in a case where a captured image recorded in the high-speed image capture mode is reproduced from a recording medium at a frame rate higher than at least a frame rate that can be supported by an external device, depending on this external device, the frame rate is reduced to a frame rate that can be supported by the external device and the captured image is output. Therefore, an image capture result can be output with higher image quality.

Incidentally, in a case where an image signal is transmitted via a network such as a home network, the case of transmission of a signal from another device via this network is also predictable. Thus, in a case where the transmission speed of the network is low, there is a case where the image signal cannot be transmitted in real time. Accordingly, in a case where an image signal read from the recording media 62 is output to the display device 97, the frame rate of the image signal to be output to the display device 97 is dynamically switched so as to be compatible with the recommended reproduction speed to prevent the image signal DV4*b* from being output to the display device 97 at an unnecessarily high frame rate. Note that this embodiment is configured in the same manner as the image capturing apparatus 10 described above, except that the frame rate of the image signal to be output to the display device 97 is different.

In the high-speed image capture mode, the control unit 81 determines a recommended reproduction speed using a motion vector detected by the image compression/expansion unit 41. Further, in a case where this determined recommended reproduction speed is 1×, four consecutive frames of an image signal DV1 whose frame rate is 240 [fps] are sequentially subjected to image combination using the camera signal processing unit 20*b* to generate an image signal DV2*b* whose frame rate is 60 [fps]. This image signal DV2*b* is output to the display device 97.

In a case where the recommended reproduction speed is (½)×, two consecutive frames of an image signal DV1 whose frame rate is 240 [fps] are sequentially subjected to image combination using the camera signal processing unit 20*b* to generate an image signal DV2*b* whose frame rate is 120 [fps]. This image signal DV4*b* is output to the display device 97. Further, in a case where the recommended reproduction speed is (¼)×, the frame rate of an image signal DV1 whose frame rate is 240 [fps] is not reduced by the camera signal processing unit 20*b*, and an image signal DV2*b* of 240 [fps] is output to the display device 97.

During the reproduction of a captured image recorded on the recording media 62 in the high-speed image capture mode, in a case where a user instructs reproduction at 1× speed, the reading from the recording media 62 is performed so that the frame rate of the image signal DV3 can be 240 [fps]. Further, the camera signal processing unit 20*b* converts the frame rate of this reproduced image signal DV3 in accordance with a recommended reproduction speed. Therefore, also in this case, in cases where recommended reproduction speeds are 1×, (½)×, and (¼)×, the camera signal processing unit 20*b* generates image signals DV4*b* whose frame rates are 60 [fps], 120 [fps], and 240 [fps], respectively, and outputs the image signals DV4*b* to the display device 97.

During the reproduction of an image signal recorded on the recording media 62 in the high-speed image capture mode, in a case where a user instructs reproduction at (½)× speed, the reading from the recording media 62 is performed so that the frame rate of the image signal DV3 can be 120 [fps]. Further, in a case where the recommended reproduction speed is 1×, the frame rate of the image signal DV3 is converted into 60 [fps] using the camera signal processing unit 20*b*, and the resulting image signal DV3 is output to the display device 97. In contrast, in cases where recommended reproduction speeds are (½)× and (¼)×, an image signal DV4*b* whose frame rate is 120 [fps] is output to the display device 97 without the frame rate being reduced.

During the reproduction of an image signal recorded on the recording media 62 in the high-speed image capture mode, in a case where a user instructs reproduction at (¼)× speed, the reading from the recording media 62 is performed so that the frame rate of the image signal DV3 can be 60 [fps]. Further, an image signal DV4*b* of 60 [fps] is output to the display device 97 with the frame rate being reduced.

During the reproduction of an image signal recorded on the recording media 62 in a high-time-resolution slow motion image capture mode, in a case where a user instructs reproduction at a recommended reproduction speed, the image combination process performed by the camera signal processing unit 20*b* is interrupted, and an image signal DV4*b* of a frame rate which is reproduced from the recording media 62 is output to the display device 97.

Note that in the standard image capture mode, also during the reproduction of a captured image recorded on the recording media 2 in the standard image capture mode, similarly, a recommended reproduction speed may be detected and the frame rate may be dynamically changed in accordance with this recommended reproduction speed. Further, the dynamic switching between frame rates in this standard image capture mode may be executed by up-converting an image signal of 60 [fps] or may be executed by switching the operation frequency of the image sensor 121 itself.

In this manner, the frame rate of an image signal to be output to an external device is dynamically switched in accordance with motion of an object. This can sufficiently reduce the amount of signal of an image signal to be sent to a network while ensuring practically sufficient image quality. Therefore, even in a case where the network is shared with another device, an image signal can be transmitted in real time.

Further, the frame rate of an image signal to be output to an external device may not necessarily be dynamically changed in accordance with a recommended reproduction speed. Alternatively, the dynamic switching may be performed in accordance with a network which is a transmission path of the image signal and/or in accordance with an external device so as to ensure real-time transmission of the image signal.

Note that the switching between frame rates in accordance with a network can be executed by, for example, when sending an image signal to the network on a packet-by-packet basis, determining the so-called degree of congestion in the network based on the waiting time for an acknowledgement to be obtained after the network is requested to send a packet, and reducing the frame rate more for higher congestion.

Further, the switching between frame rates in accordance with an external device can be executed by, for example, when sending an image signal to the external device on a packet-by-packet basis, counting the waiting time for an acknowledgement of transmission to be obtained after the external device is requested to transmit an image signal, and more greatly reducing the frame rate for a longer waiting time.

Note that in the embodiment described above, a case has been described where the frame rate of an image signal is reduced using cyclic addition. However, the present invention is not limited thereto, and the frame rate can be reduced by simply performing an addition process on corresponding image signals of a plurality of frames. In addition, in a case where a practically sufficient image quality can be ensured, the frame rate can be reduced using frame decimation.

Further, in the embodiment described above, a case has been described where the reference frame rate is set to 60 [fps] and where, in the high-speed image capture mode, an image signal DV1 having a frame rate of 240 [fps] which is four times the reference frame rate is generated. However, the present invention is not limited thereto, and can be widely applied to cases where image capture is performed at various frame rates, such as, for example, a case where an image signal DV1 having a frame rate which is three times the reference frame rate is generated.

Further, in the embodiment described above, a case has been described where an image obtained by performing image capture in the high-speed image capture mode is reproduced at 1× speed, (½)× speed, and (¼)× speed: However, the present invention is not limited thereto, and can also be widely applied to a case where, for example, the image is reproduced at (⅓)× speed and other cases.

In addition, in the embodiment described above, a case has been described where an image signal of the non-interlaced type is generated. However, the present invention is not limited thereto, and can also be widely applied to a case where an image signal of the interlaced type is generated.

Industrial Applicability

The present invention is suitable for, for example, performing image capture at an image rate higher than a normal image rate of video signal to generate an image signal and obtaining a slow motion reproduction image using this image signal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An image reproducing apparatus comprising:
a signal reproducing unit that reproduces an image signal of a captured image that is generated by performing image capture at an image rate higher than a preset image rate;
a reproduction control information generating unit that generates reproduction control information using a motion detection result obtained by performing motion detection using the image signal output from the signal reproducing unit;
a signal processing unit that converts an image rate of the image signal output from the signal reproducing unit into the preset image rate by combining frames of the image signal; and
a control unit that controls the image rate of the image signal supplied from the signal reproducing unit to the signal processing unit on the basis of the reproduction control information to reduce a reproduction speed of the captured image in accordance with an increase in motion indicated by the motion detection result,
wherein the control unit sets weighting coefficients for respective frames of the image signal based on the motion detection result, and the signal processing unit combines the frames according to the weighting coefficients, and
wherein the respective frames of the image signal are weighted with at least one of at least two weighting coefficients.

2. The image reproducing apparatus according to claim 1, wherein the reproduction control information generating unit determines a recommended reproduction speed from a motion amount of a motion vector obtained by performing the motion detection, and sets the recommended reproduction speed as the reproduction control information.

3. The image reproducing apparatus according to claim 2, wherein the reproduction control information generating unit determines the recommended reproduction speed on the basis of a result of comparison between a difference in motion amount between a region of a center portion of the captured image and a remaining region of the captured image and a preset threshold value.

4. The image reproducing apparatus according to claim 2, further comprising an expansion processing unit that performs an expansion process on the image signal in a case where the image signal is an image signal that has been subjected to a compression process using a motion vector obtained by performing motion detection,
wherein the reproduction control information generating unit generates the reproduction control information using the motion vector used in the expansion process.

5. The image reproducing apparatus according to claim 1, further comprising a signal recording unit that records, on a recording medium, an image signal of a captured image that is generated by performing image capture at an image rate higher than the preset image rate,
wherein the reproduction control information generating unit generates the reproduction control information using the image signal recorded on the signal recording unit,
wherein the signal recording unit records the reproduction control information generated by the reproduction control information generating unit on the recording medium in association with the image signal,
wherein the signal reproducing unit reproduces the image signal and the reproduction control information, and
wherein the control unit controls an image rate of an image signal output from the signal reproducing unit on the basis of the reproduction control information reproduced by the signal reproducing unit.

6. An image reproducing method comprising:
reproducing an image signal of a captured image that is generated by performing image capture at an image rate higher than a preset image rate;

generating reproduction control information using a motion detection result obtained by performing motion detection using the image signal;

converting an image rate of the image signal into the preset image rate by combining frames of the image signal;

controlling the image rate of the image signal on the basis of the reproduction control information to reduce a reproduction speed of the captured image in accordance with an increase in motion detected in the motion detection result; and setting weighting coefficients for respective frames of the image signal based on the motion detection result, wherein the frames are combined according to the weighting coefficients, and wherein the respective frames of the image signal are weighted with at least one of at least two weighting coefficients.

7. An image capturing apparatus comprising:

an image capturing unit that generates an image signal of a captured image that is generated by performing image capture at an image rate higher than a preset image rate;

a reproduction control information generating unit that generates, using a motion detection result obtained by performing motion detection using the image signal generated by the image capturing unit, reproduction control information for reducing a reproduction speed of the captured image in accordance with an increase in motion detected in the motion detection during reproduction of the image signal, wherein the reproduction control information generating unit sets weighting coefficients for respective frames of the image signal based on the motion detection result, and the respective frames of the image signal are weighted with at least one of at least two weighting coefficients; and an output unit that outputs the reproduction control information in correspondence with the image signal.

8. The image capturing apparatus according to claim 7, wherein the reproduction control information generating unit determines a recommended reproduction speed from a motion amount of a motion vector obtained by performing the motion detection, and sets the recommended reproduction speed as the reproduction control information.

9. The image capturing apparatus according to claim 8, wherein the reproduction control information generating unit determines the recommended reproduction speed on the basis of a result of comparison between a difference in motion amount between a region of a center portion of the captured image and a remaining region of the captured image and a preset threshold value.

10. The image capturing apparatus according to claim 7, further comprising a signal processing unit that converts the image signal generated by the image capturing unit into the preset image, rate, wherein the reproduction control information generating unit performs the motion detection using the image signal converted into the preset image rate by the signal processing unit.

11. The image capturing apparatus according to claim 7, further comprising an image compression unit that compresses an amount of signal of the image signal using a motion detection result obtained by performing motion detection using the image signal, wherein the reproduction control information generating unit generates the reproduction control information using the motion detection result obtained by the image compression unit.

12. A control method for an image capturing apparatus, comprising:

generating an image signal of a captured image that is generated by performing image capture at an image rate higher than a preset image rate;

generating, using a motion detection result obtained by performing motion detection using the image signal, reproduction control information for reducing a reproduction speed of the captured image in accordance with an increase in motion detected in the motion detection during reproduction of the image signal;

setting weighting coefficients for respective frames of the image signal based on the motion detection result, wherein the respective frames of the image signal are weighted with at least one of at least two weighting coefficients; and outputting the reproduction control information in correspondence with the image signal.

* * * * *